United States Patent
Kohlmeier et al.

(10) Patent No.: US 10,402,061 B2
(45) Date of Patent: Sep. 3, 2019

(54) PRODUCTIVITY TOOLS FOR CONTENT AUTHORING

(71) Applicant: Microsoft Technology Licensing, LLC, Redmond, WA (US)

(72) Inventors: Bernhard S. J. Kohlmeier, Seattle, WA (US); Pradeep Chilakamarri, Seattle, WA (US); Sirui Sun, Bellevue, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 14/738,091

(22) Filed: Jun. 12, 2015

(65) Prior Publication Data

US 2016/0188143 A1 Jun. 30, 2016

Related U.S. Application Data

(63) Continuation-in-part of application No. 14/499,195, filed on Sep. 28, 2014.

(60) Provisional application No. 62/131,142, filed on Mar. 10, 2015.

(51) Int. Cl.
*G06F 17/24* (2006.01)
*G06F 3/0484* (2013.01)
*G06F 3/0482* (2013.01)
*G06F 16/33* (2019.01)

(52) U.S. Cl.
CPC .......... *G06F 3/0484* (2013.01); *G06F 3/0482* (2013.01); *G06F 16/3331* (2019.01); *G06F 17/24* (2013.01)

(58) Field of Classification Search
CPC .. G06F 17/24; G06F 17/241; G06F 17/30011; G06F 17/30253; G06F 17/30884; G06F 17/3089; G06F 17/30979; G06F 3/0484; G06F 3/0482; G06F 16/3331
See application file for complete search history.

(56) References Cited

U.S. PATENT DOCUMENTS

| | | | | |
|---|---|---|---|---|
| 5,724,595 A | * | 3/1998 | Gentner | ............ G06F 17/30882 707/E17.013 |
| 6,112,203 A | | 8/2000 | Bharat et al. | |
| 6,219,679 B1 | * | 4/2001 | Brisebois | .......... G06F 17/30855 707/E17.013 |

(Continued)

OTHER PUBLICATIONS

"International Preliminary Report on Patentability Issued in PCT Application No. PCT/US2015/052653", dated May 9, 2017, 6 Pages.

(Continued)

*Primary Examiner* — Wilson W Tsui
(74) *Attorney, Agent, or Firm* — Talem IP Law, LLP

(57) ABSTRACT

An assisted content authoring productivity tool can provide a set of content related to at least one topic determined from a user's expression of intent. The content can include topics that are not obviously related to the user's topic, but identified from indirect cluster connections found in a graph model of information such as, but not limited to, an online encyclopedia like Wikipedia. A document can be populated with topic anchors so a user can return to or have generated a set of content related to a particular topic. The topic anchor can include a graphical user interface including a topic exploration object that, when selected, initiates a command to request information related to that topic.

18 Claims, 27 Drawing Sheets

(56) References Cited

U.S. PATENT DOCUMENTS

| | | | |
|---|---|---|---|
| 6,421,675 B1 | 7/2002 | Ryan et al. | |
| 6,480,837 B1 | 11/2002 | Dutta | |
| 6,675,159 B1 | 1/2004 | Lin et al. | |
| 6,912,694 B1 | 6/2005 | Harrison et al. | |
| 7,080,076 B1* | 7/2006 | Williamson | G06F 17/24 |
| 7,213,198 B1 | 5/2007 | Harik | |
| 7,756,850 B2 | 7/2010 | Keith, Jr. | |
| 7,831,601 B2 | 11/2010 | Oral et al. | |
| 7,984,035 B2 | 7/2011 | Levin et al. | |
| 8,046,387 B2 | 10/2011 | Nelson | |
| 8,121,902 B1* | 2/2012 | Desjardins | G06Q 30/0601 |
| | | | 705/26.1 |
| 8,352,397 B2 | 1/2013 | Rubin et al. | |
| 8,380,723 B2 | 2/2013 | Radlinski et al. | |
| 8,452,769 B2 | 5/2013 | Altaf et al. | |
| 8,479,094 B2 | 7/2013 | Fouts | |
| 8,560,485 B2 | 10/2013 | Labrou et al. | |
| 8,583,673 B2 | 11/2013 | Tarek et al. | |
| 8,676,815 B2 | 3/2014 | Deng et al. | |
| 9,053,190 B1 | 6/2015 | Boenau et al. | |
| 9,213,470 B2* | 12/2015 | Yoshida | G06F 3/0484 |
| 9,792,015 B2* | 10/2017 | Baer | G06F 3/04842 |
| 2004/0093559 A1 | 5/2004 | Amaru et al. | |
| 2005/0091578 A1* | 4/2005 | Madan | G06F 17/241 |
| | | | 715/201 |
| 2005/0154760 A1 | 7/2005 | Bhakta et al. | |
| 2006/0004892 A1 | 1/2006 | Lunt et al. | |
| 2006/0085469 A1 | 4/2006 | Pfeiffer et al. | |
| 2006/0184512 A1 | 8/2006 | Kohanim et al. | |
| 2008/0071803 A1 | 3/2008 | Boucher | |
| 2008/0104061 A1 | 5/2008 | Rezaei | |
| 2008/0229244 A1 | 9/2008 | Markus et al. | |
| 2008/0281793 A1 | 11/2008 | Mathur | |
| 2009/0300547 A1 | 12/2009 | Bates et al. | |
| 2009/0327264 A1 | 12/2009 | Yu et al. | |
| 2010/0077290 A1 | 3/2010 | Pueyo | |
| 2010/0082570 A1 | 4/2010 | Altaf et al. | |
| 2010/0082610 A1 | 4/2010 | Anick et al. | |
| 2010/0125781 A1 | 5/2010 | Gadacz | |
| 2010/0325535 A1* | 12/2010 | Reddy | G06F 17/24 |
| | | | 715/246 |
| 2011/0026901 A1 | 2/2011 | Kashima | |
| 2011/0078615 A1 | 3/2011 | Bier | |
| 2011/0083167 A1 | 4/2011 | Carpenter et al. | |
| 2011/0087661 A1 | 4/2011 | Quick et al. | |
| 2011/0093459 A1 | 4/2011 | Dong et al. | |
| 2011/0099464 A1* | 4/2011 | Marashi | G06Q 10/107 |
| | | | 715/208 |
| 2011/0107194 A1* | 5/2011 | Cui | G06F 17/241 |
| | | | 715/206 |
| 2011/0119248 A1 | 5/2011 | Abe et al. | |
| 2011/0238650 A1 | 9/2011 | Jenkins et al. | |
| 2011/0252060 A1 | 10/2011 | Broman et al. | |
| 2012/0136887 A1 | 5/2012 | Cha et al. | |
| 2012/0151310 A1 | 6/2012 | El-kalliny | |
| 2012/0191716 A1 | 7/2012 | Omoigui Nosa | |
| 2012/0198381 A1* | 8/2012 | Kumamoto | G06F 17/212 |
| | | | 715/781 |
| 2012/0265767 A1 | 10/2012 | Brdiczka et al. | |
| 2012/0284245 A1 | 11/2012 | Portnoy et al. | |
| 2012/0317109 A1 | 12/2012 | Richter et al. | |
| 2013/0036348 A1 | 2/2013 | Hazard | |
| 2013/0086526 A1 | 4/2013 | Nowakowski et al. | |
| 2014/0136468 A1 | 5/2014 | Faratin et al. | |
| 2014/0136506 A1 | 5/2014 | Ratner et al. | |
| 2014/0164890 A1* | 6/2014 | Fox | G06F 17/24 |
| | | | 715/202 |
| 2014/0173426 A1* | 6/2014 | Huang | G06F 17/24 |
| | | | 715/256 |
| 2014/0176607 A1 | 6/2014 | Yang et al. | |
| 2014/0188925 A1 | 7/2014 | Skolicki | |
| 2014/0281850 A1 | 9/2014 | Prakash et al. | |
| 2014/0289597 A1* | 9/2014 | Kim | G06F 17/2247 |
| | | | 715/205 |
| 2015/0100562 A1 | 4/2015 | Kohlmeier et al. | |
| 2015/0120700 A1 | 4/2015 | Holm et al. | |
| 2016/0357842 A1 | 12/2016 | Kohlmeier et al. | |

OTHER PUBLICATIONS

"Second Written Opinion Issued in PCT Application No. PCT/US2015/052653", dated Mar. 10, 2017, 5 Pages.

"International Search Report & Written Opinion Issued in PCT Application No. PCT/US2015/052653", dated Dec. 23, 2015, 10 Pages.

Li, et al., "Online Web-Video Topic Detection and Tracking with Semi-supervised Learning", In Proceedings of the Third International Conference of Grid and Co-operative Computing, vol. 3251, Dec. 13, 2013, pp. 750-759.

Bosnic, et al., "Automatic Keywords Extraction—a Basis for Content Recommendation", In Proceedings of the Fourth International Workshop on Search and Exchange of E-learning Materials; Sep. 27, 2010; 10 pages.

Crystal, Abe, "Interface Design for Metadata Creation", In Proceedings of the Human Factors in Computing Systems Conference, Apr. 5, 2003, 2 pages.

Paris, et al., "Capturing the User's Reading Context for Tailoring Summaries", In Proceedings of 17th International Conference User Modeling, Adaptation, and Personalization: Formerly UM and AH, Jun. 22, 2009, 6 pages.

"Reference Manager", Published on: Dec. 2010 Available at: http://www.refman.com/rmwhatsnew.asp.

U.S. Appl. No. 14/499,195, Bernhard S.J. Kohlmeier, et al., "Productivity Tools for Content Authoring", filed Sep. 28, 2014.

"Britannica Researcher", Retrieved from: https://web.archive.org/web/20130106191050/http://office.microsoft.com:80/en-us/store/britannica-researcher-WA102924944.aspx, Retrieved Date: Jan. 6, 2013, 2 Pages.

"Document Collaboration and Co-Authoring", Retrieved from: https://support.office.com/en-gb/article/Document-collaboration-and-co-authoring-ee1509b4-1f6e-401e-b04a-782d26f564a4?ui=en-US&rs=en-GB&ad=GB, Retrieved on: Mar. 13, 2015, 5 Pages.

"Encyclopedia Definition", Retrieved from https://web.archive.org/web/20131028173256/http://www.merriam-webster.com/dictionary/encyclopedia, Oct. 28, 2013, 3 Pages.

"Enterprise Content Creation", Retrieved from: https://web.archive.org/web/20150315210239/http://www.objective.com/products/enterprise-content-creation/collaborative-authoring, Retrieved on: Mar. 15, 2015, 3 Pages.

"Final Office Action Issued in U.S. Appl. No. 14/499,195", dated Dec. 23, 2016, 17 Pages.

"Final Office Action Issued in U.S. Appl. No. 14/499,195", dated Dec. 7, 2017, 18 Pages.

"Non Final Office Action Issued in U.S. Appl. No. 14/499,195", dated May 11, 2017, 17 Pages.

"Non Final Office Action Issued in U.S. Appl. No. 14/499,195", dated Jun. 7, 2016, 18 Pages.

"Non-Final Office Action Issued in U.S. Appl. No. 14/499,195", dated May 14, 2018, 19 Pages.

"Final Office Action Issued in U.S. Appl. No. 14/729,644", dated Oct. 5, 2017, 20 Pages.

"Final Office Action Issued in U.S. Appl. No. 14/729,644", dated Sep. 19, 2018, 19 Pages.

"Non Final Office Action Issued in U.S. Appl. No. 14/729,644", dated May 30, 2017, 21 Pages.

"Non Final Office Action Issued in U.S. Appl. No. 14/729,644", dated May 9, 2018, 23 Pages.

Boubas, et al., "Social Content Authoring with No Social Traps", In International Conference on Collaboration Technologies and Systems (CTS), May 20, 2013, 4 Pages.

Melville, et al., "Content-Boosted Collaborative Filtering for Improved Recommendations", In Proceedings of the Eighteenth National Conference on Artificial Intelligence, Jul. 28, 2002, 6 Pages.

Middleton, et al., "Exploiting Synergy Between Ontologies and Recommender Systems", In Proceedings of International Workshop on the Semantic Web Conference, Apr. 8, 2002, 10 Pages.

(56) References Cited

OTHER PUBLICATIONS

Oral, et al., "Dealing with the Cold Start Problem when Providing Personalized Enterprise Content Recommendations", Retrieved from: https://pdfs.semanticscholar.org/d134/2948d571da7e9f29135c7404df65e4cef861.pdf, Retrieved Date: Dec. 11, 2013, 4 Pages.

"International Preliminary Report on Patentability Issued in PCT Patent Application No. PCT/US2015/052534", dated Dec. 13, 2016, 6 Pages.

"International Search Report and Written Opinion in PCT Application No. PCT/US2015/052534", dated Jan. 4, 2016, 10 Pages.

"Second Written Opinion Issued in PCT Application No. PCT/US2015/052534", dated Aug. 11, 2016, 5 Pages.

"International Preliminary Report on Patentability Issued in PCT Application No. PCT/US2016/035364", dated Apr. 25, 2017, 7 Pages.

"International Search Report and Written Opinion Issued in PCT Application No. PCT/US2016/035364", dated Jul. 27, 2016, 11 Pages.

"Second Written Opinion Issued in PCT Application No. PCT/US2016/035364", dated Jan. 25, 2017, 6 Pages.

Weng, et al., "Exploiting Item Taxonomy for Solving Cold-start Problem in Recommendation Making", In 20th IEEE International Conference on Tools with Artificial Intelligence, vol. 2, Nov. 3, 2008, 8 Pages.

"Notice of Allowance Issued in U.S. Appl. No. 14/499,195", dated Oct. 4, 2018, 13 Pages.

\* cited by examiner

FIG. 12G

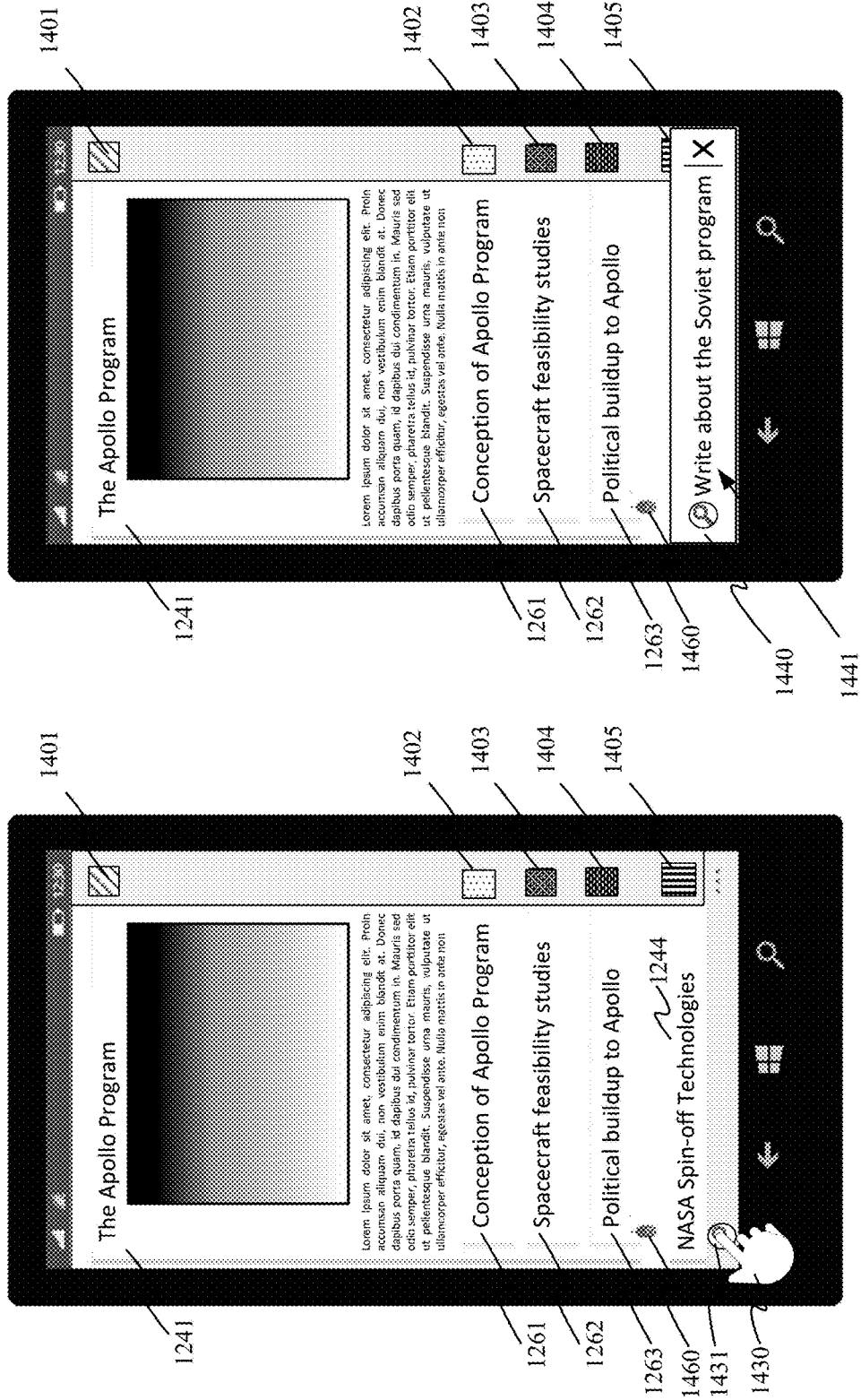

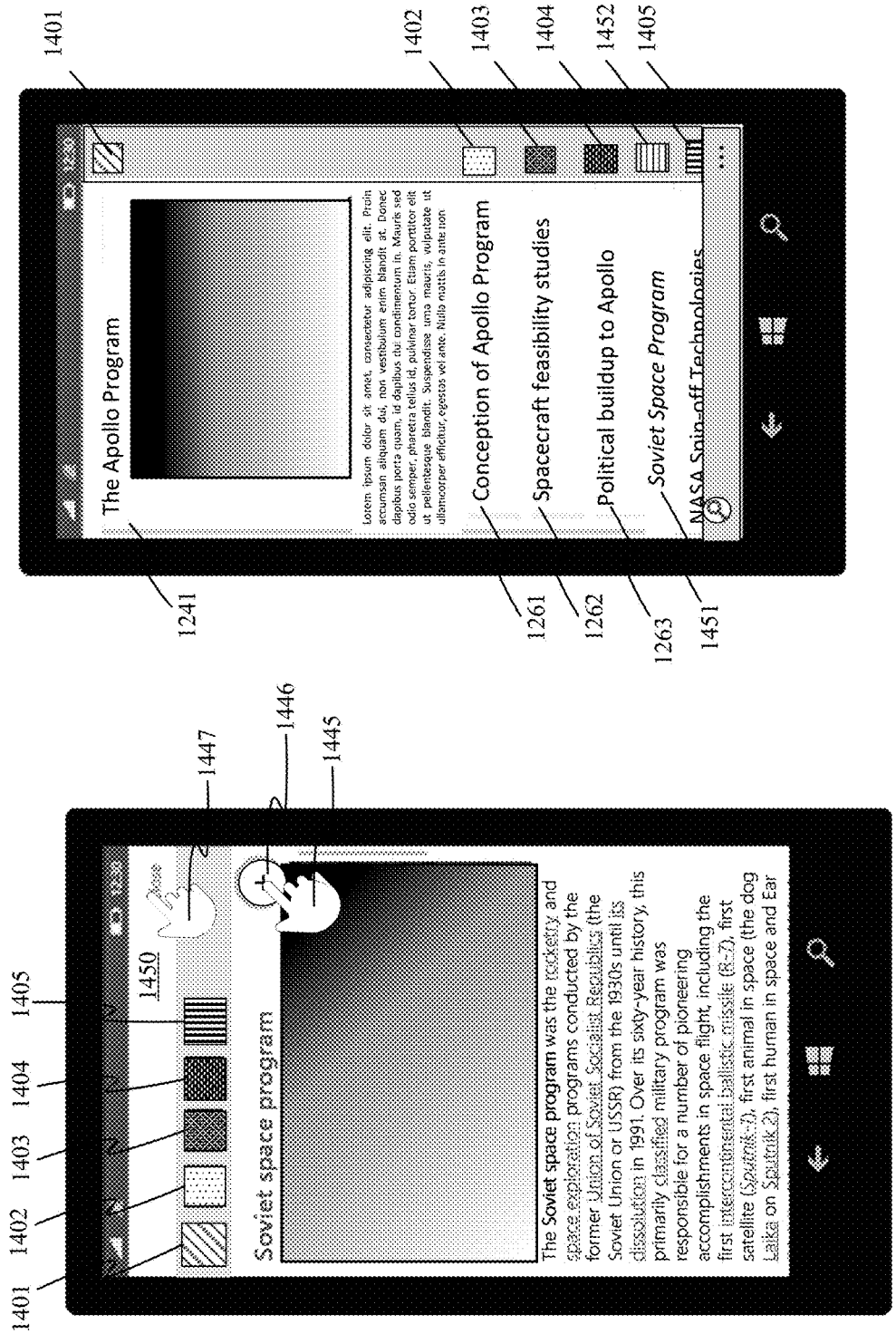

PRODUCTIVITY TOOLS FOR CONTENT AUTHORING

CROSS REFERENCE TO RELATED APPLICATION(S)

This application is a continuation-in-part of U.S. application Ser. No. 14/499,195, filed Sep. 28, 2014, and claims the benefit of U.S. Provisional Application Ser. No. 62/131,142, filed Mar. 10, 2015.

BACKGROUND

Productivity applications can include a variety of tools and information that facilitate the accomplishment of a variety of tasks related to producing content, including creating and editing content within different types of documents such as word processing documents, spreadsheets, and presentations. In some cases, productivity applications can be considered to be, or to include, content authoring applications.

While creating and editing content within a productivity application, a user may start with a blank page, information "borrowed" from other sources, or from an existing document. The blank page is a well-known challenge for many people trying to get started creating a document—whether it is a homework assignment, a white paper, a journal, a schedule, or other task.

BRIEF SUMMARY

Techniques and systems for facilitating content authoring are presented. Content from local and/or online resources that are related to at least one topic determined from a user's expression of intent can be provided to a user for reuse. Instead of directly inserting parts or all of the content provided to the user, the user can insert topic anchors into a document to provide a placeholder for as-of-yet uncommitted content around a topic.

The topic anchors can enable a user to return to or have generated a set of content related to a particular topic associated with the topic anchor. The topic anchor can include a graphical user interface including a topic exploration object that, when selected, initiates a command to request information related to that topic. In some cases, the topic anchor can include an annotation object in which content may be entered (and which can later be inserted into the document either directly or by some other action like replicating or copying and pasting).

A productivity application can include instructions that, in response to receiving an indication to insert a topic anchor, detect a location of an insertion point in an authoring surface of a document; create a topic exploration object; and dynamically position a graphical user interface comprising the topic exploration object in a position corresponding to the insertion point. Then, when the topic exploration object is selected, the productivity application can request content relevant to a topic identified by the topic anchor and present the results to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 12A-12M illustrate a graphical user interface and corresponding actions taken by a productivity application providing a topic exploration object.

FIGS. 14A-14F illustrate a mobile experience.

DETAILED DESCRIPTION

Figure 1A:
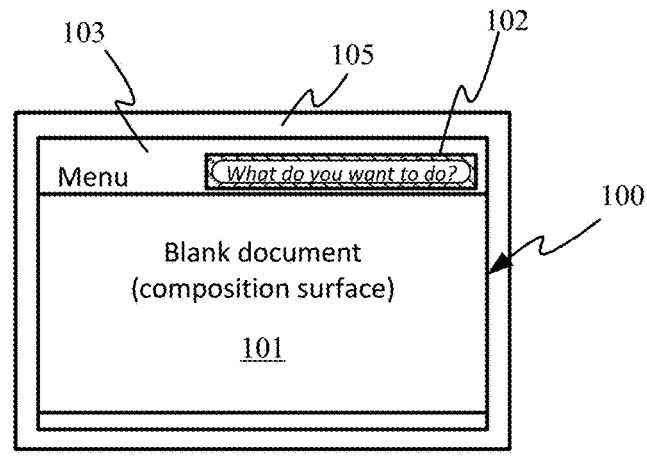
FIGS. 1A and 1B illustrate simplified representations of a graphical user interface of a productivity application and associated productivity tool user input interface provided on a single device (FIG. 1A) and across multiple devices (FIG. 1B).

Techniques and systems for facilitating content authoring are presented. Productivity tools for assisted content authoring are described that can help a user incorporate content more efficiently and interactively in a productivity application or other content authoring application.

Examples of productivity applications include the Microsoft Office® suite of applications from Microsoft Corp., including Microsoft Word®, Microsoft Excel®, Microsoft PowerPoint®, as well as the web application components thereof, all registered trademarks of Microsoft Corp.; Google Docs (and Google Drive™); the Apache OpenOffice™ available from the Apache Software Foundation; the LibreOffice® suite of applications available from The Document Foundation, registered trademarks of The Document Foundation; and the Apple iWork® suite of applications from Apple Inc, including Apple Pages®, Apple Keynote®, and Apple Numbers®, all registered trademarks of Apple Inc.

In some cases, features of the productivity tools described herein may be incorporated into any of the productivity applications. In some cases, the productivity tools described herein may be an add-on feature or application for an existing productivity application or other content authoring application through which content authoring may take place. In addition, systems supporting the described productivity tools can be used by various productivity applications.

Productivity applications and other content authoring applications incorporating the described productivity tools may be delivered as software services from what is colloquially referred to as "the cloud". In these deployments, a local application may run on a user's device that provides a user interface to an application service hosted in a data center or some other computing environment. For example, in some cases, the user interface to a productivity application may be generated on a local computer, tablet or a smartphone; or the user interface to the productivity application may be generated from a cloud server and sent to a client for rendering. The user interface may be generated as part of a service. In some cases, the user interface may be integrated with other services, such as social networking services and/or information management services.

The files (e.g., documents, presentations, notebooks, spreadsheets, and the like) that a user works with may be stored locally, may be stored by the service, and/or may be stored by an associated cloud-based storage service. Any number of computing devices may be leveraged to take advantage of such services, including, but not limited to, mobile devices, smart phones, laptops, tablets, desktop computers, and any other suitable platform.

Constant context switching can occur between a search engine-based web browser and a content authoring application when a user is researching a topic and copying and pasting from a web page to a document or other file. Similarly, context switching may occur when a user searches local and remote files for relevant documents (and opens one or more of those documents to view the content within). In some cases, to minimize context switching, a topic research capability can be incorporated into a productivity application, for example, by creating a search bar within, or accessible by, the productivity application. In some cases, relevant information can be presented to a user as part of a recommender system for the productivity application.

In a recommender system, recommendations are generally made based on context. However, the blank page creates a "cold start" scenario where there is insufficient information for a system to use to draw inferences for providing a recommendation to a user.

As described herein, the cold start scenario is addressed by providing a user input interface for assisted content authoring through which a user can express their intent related to an outcome and/or subject of the content authoring project. It should be understood that, in some cases, the productivity tool can identify a user's intent without use of an input field and may instead identify a user's intent implicitly.

An outcome refers to the end product that the user desires to have accomplished. A subject refers more specifically to a person, place, thing, or idea that is doing or being something. An intent related to a subject refers to an intent to know more about the subject; whereas an intent related to an outcome may involve a goal or task in addition to knowledge about a subject. For example, an intent to "write" refers to an intent to perform an activity, an intent to "write about a famous tennis player" refers to an intent related to a subject (e.g., to know more about a tennis player) and an intent to "write a paper about a famous tennis player" refers to an intent related to an outcome of a paper about the tennis player. When the phrase or term "a user's intent" or "expression of intent" is used herein, it is intended to refer to an intent related to the outcome and/or subject of the content authoring project.

In some cases, the cold start scenario may be further supplemented with signals from other context (outside of the productivity application instance), such as email, an enterprise directory or collaborative file, web browsing history, or even prior authored content created by that user (or some other specified user or group of users). Sometimes the context signals are user specific and sometimes the context signals are based on collective information (across multiple users).

In some cases, no explicit expression of intent is received by the system; however, the productivity tool can use signals from immediate context as well as the other context to identify relevant information. For example, relevant content may be shown to the user as soon as the user enters a document title (e.g., a line at a top of a word processing document or text of a title slide in a presentation document) or even as a result of giving a document a file name (the "expression of intent" being considered the name of the file in this case).

The user input interface can include an input field that can receive the user's expression of intent via a typing keyboard, a touch keyboard or display, a motion gesture, a touch gesture, a stylus (e.g., "inking"), head, eye and gaze tracking, brain activity, or voice input. In some cases, the input field can be provided as part of a menu, tool bar, task bar/pane, or other graphical user interface element located on a same or different visual display as a content authoring surface of a productivity application. Although specific implementations are described with respect to graphical user interfaces, it should be understood that natural user interface (NUI) components may be used in addition to or in place of graphical user interface components.

Figure 1B:
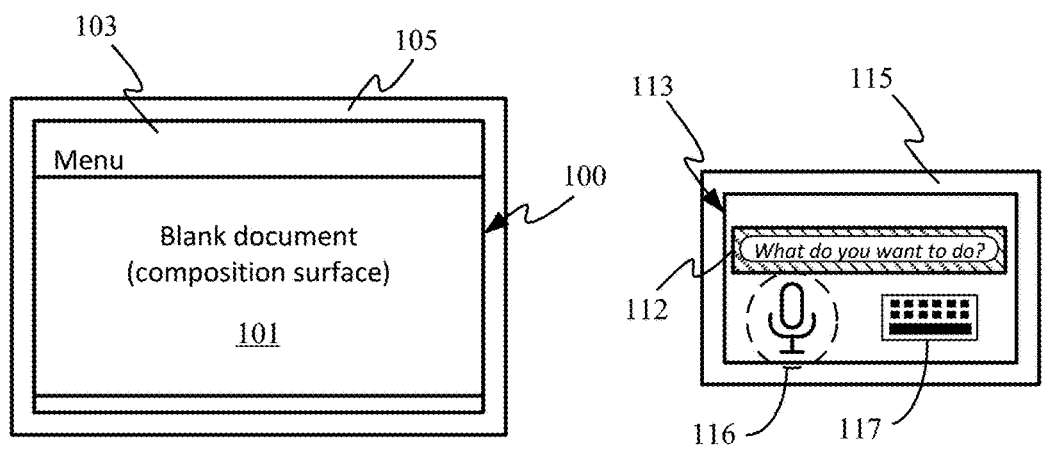

FIGS. 1A and 1B illustrate simplified representations of a graphical user interface of a productivity application and associated productivity tool user input interface provided on a single device (FIG. 1A) and across multiple devices (FIG. 1B).

Referring to FIG. 1A, a graphical user interface 100 of a productivity application or other content authoring application may initially have a content authoring surface 101 in a blank state, for instance due to a default state for a "new" document (or other file type). An entry point to an assisted content authoring productivity tool may be an input field 102 available as part of a tool bar 103 for the productivity application. The graphical user interface 100 can be rendered on a display screen 105 associated with a computing device (which can be a computing system 800 such as described with respect to FIG. 8). In some cases, the display screen may be physically connected to a processing system of the computing device, for example, by cables or by being built into a package containing the processing system of the computing device. In some cases, the display screen may be wirelessly connected to the processing system. In some cases, the display screen is any surface on which the graphical user interface is projected. Such surfaces include a wall, an object surface, a body surface, or even what appears to be in space (e.g., a "hovering display" using a projector and prism or a virtual retinal display).

Other entry points to the assisted content authoring productivity tool are contemplated. For example, the entry point may be directly from the content authoring surface 101 (for example as an implicit expression of intent such as the title slide example above or an explicit expression of intent input directly to the content authoring surface such as using a character—like a hashtag—to distinguish that the text is being used as the expression of intent). As another example, in FIG. 1B, instead of including the entry point to the assisted content authoring productivity tool as part of the tool bar 103 in the graphical user interface 100 of the productivity application, the entry point to the assisted content authoring productivity tool can be provided on a separate device. For example, an input field 112 can be provided as part of a user input interface 113 of an instance of the productivity application or an instance of the productivity tool running on a separate device 115. Although voice input 116 and text input 117 are illustrated, it should be understood that any suitable input device or functionality may be used (including gestural, non-contact input and motion-based). The separate device 115 may be embodied as a computing system 800 such as described with respect to FIG. 8.

The separate device 115 may either communicate directly with the computing device associated with the display screen 105 or may communicate with a productivity application service (e.g., available from a "cloud" service or available from an enterprise server or the like) so that information may be exchanged between the applications running on the two devices. For example, input to the user input interface 113 can affect what is input to or read from the content authoring surface 101. Where the display 105 is a large-scale touch sensitive display, such as the Samsung SUR40 with Microsoft PixelSense™, the input field 112 of the user input interface 113 may, in some cases, be provided on a separate region of the display screen than that displaying the graphical user interface 100 of the productivity application.

Through the user input interface to assisted content authoring (e.g., 102, 112 or via implicit means), the productivity tool can receive an indication of a user's intent. The productivity tool can receive any arbitrary request representing a user's expression of intent. For example, a user can input an expression having a topic and/or action request in the form of a natural language statement or query concerning what they want to do. As some illustrative examples, the user may input the expression "I want to write a paper about Albert Einstein," "How to grow grapes," or "have to discuss the Great Gatsby." The request does not have to be a complete sentence; rather, the natural language aspect of the input field refers to the flexibility of the structure of the request. For examples, in some cases, fill-in-the-blank style input fields can be used to facilitate the entry of topic information.

The productivity tool can then take the user's request that was input through the input field 102, 112 (or received implicitly by monitoring content input to an authoring surface) and generate information relevant to the user's intent for the document. The user's expression of intent (as related to outcome and/or subject) provides at least part of an initial nucleus of context from which the productivity tool can generate the information. In some cases, the user's expression of intent can be used with one or more items of context about the user (with user permission) such as but not limited to recorded user interests, their field of work, their authoring history, and the documents (or other files) the user previously accessed or read. The generated information can be presented to the user so that the user can further explore the topics (and entities) described in the generated information and/or begin working within the document (or other file).

Figure 2A:
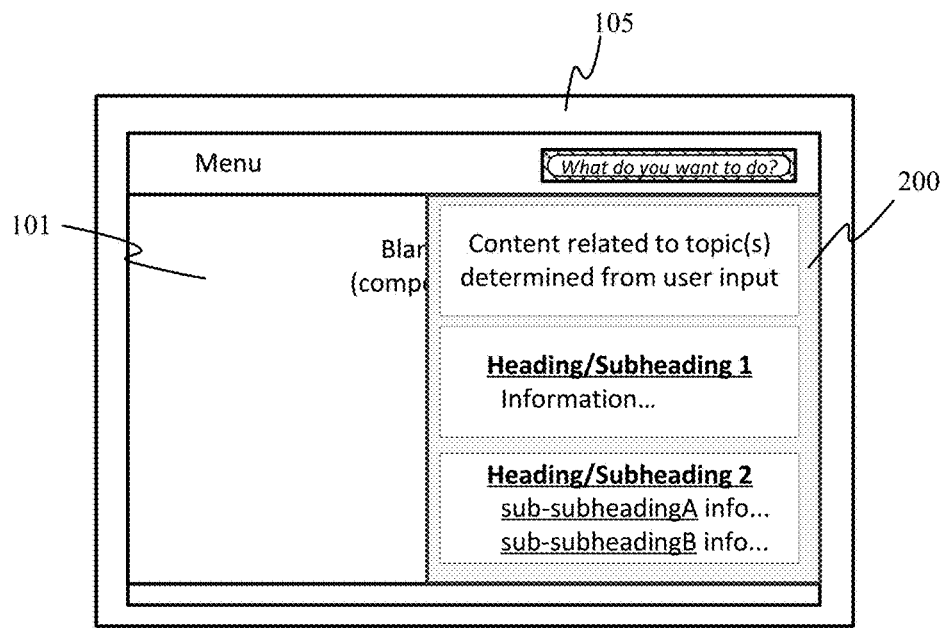
FIGS. 2A and 2B illustrate simplified representations of a graphical user interface of a productivity application and associated productivity tool user input interface with relevant content provided on a single device (FIG. 2A) and across multiple devices (FIG. 2B).
Figure 2B:
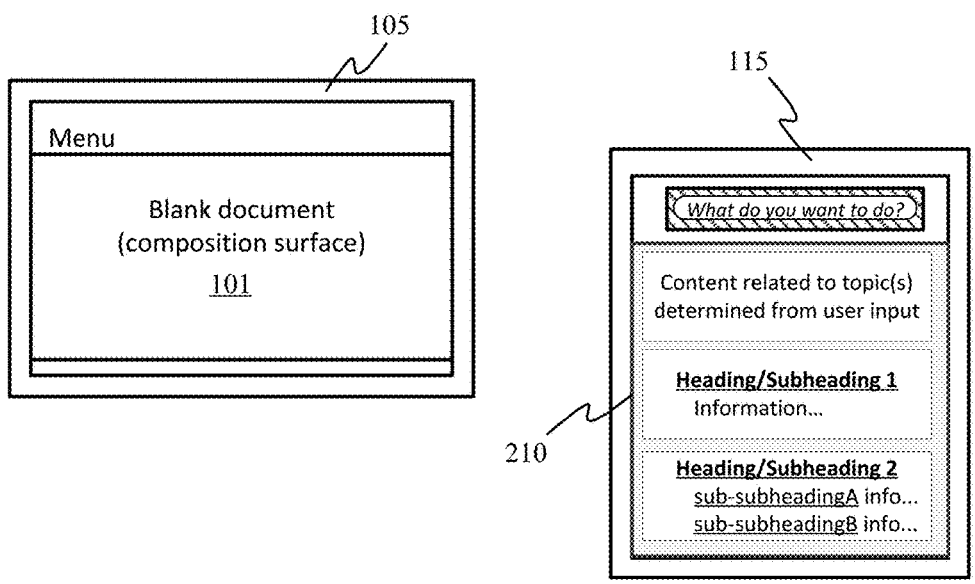

FIGS. 2A and 2B illustrate simplified representations of a graphical user interface of a productivity application and associated productivity tool user input interface with relevant content provided on a single device (FIG. 2A) and across multiple devices (FIG. 2B). In FIG. 2A, the productivity tool for assisted content authoring can surface the relevant content related to the topic(s) determined from user input in an interface (e.g., a panel 200) overlaying the content authoring surface 101 on the display screen 105.

The panel 200 can be part of a graphical user interface for the productivity tool in which information and available commands can be presented to a user. A user can interact with the user interface represented in the panel 200 to initiate actions carried out by the productivity tool.

It should be understood that the graphical user interface to the productivity tool for assisted content authoring may be may be integrated as part of a single graphical user interface (e.g., of the productivity application and/or the device on which the interfaces are displayed), or the graphical user interface to the productivity tool for assisted content authoring may be a separate graphical user interface from the graphical user interface to the productivity application (e.g., as a separate window, as an independent display, or as a separate software component that communicates with but is not intrinsic to the productivity application), or the two aforementioned graphical user interfaces.

In the case illustrated in FIG. 2B, the relevant content may be surfaced in a window 210 (or panel or other type of graphical user interface screen) rendered on the separate device 115 (or in a separate window from the content authoring surface 101 on the display screen 105).

Figure 3:
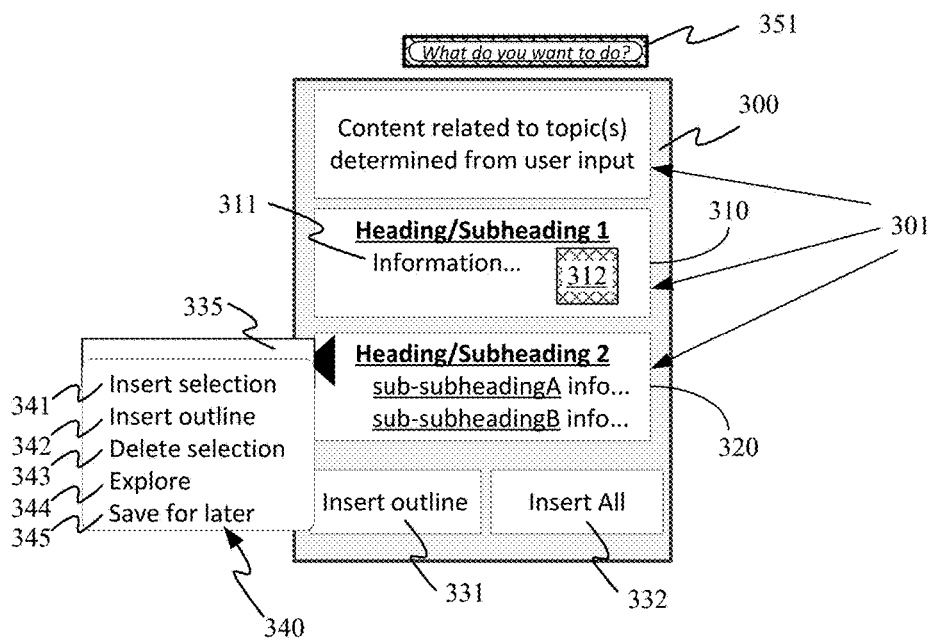
FIG. 3 illustrates example representative components of a user interface to a productivity tool for assisted content authoring.

User interface elements that may be present in the panel 200 or window 210 include input controls, navigational components and informational components. FIG. 3 illustrates example representative components of a user interface to a productivity tool for assisted content authoring.

As shown in FIG. 3, informational components in the interface 300 can be used to display relevant content 301 related to topic(s) determined from the user input. In some cases, the relevant content 301 can be presented in the form of a preview of one or more related content of relevant information from one or more sources. The preview can be based on the recognized entities of the information being presented. The relevant information can be generated by a recommender engine that determines at least one topic and/or entity input as part of the user's request, performs a lookup and/or search from a source accessible over a network, and retrieves information from the lookup and/or search to present such information back to the user.

The content presented in the interface 300 can be provided in content views 310, 320, which may be in the form of a preview, a template version (e.g., the particular presentation based on an entity model, "entity-based template") or some other presentation of the retrieved information. For example, one content view 310 may include text 311 and images 312; and another content view 320 may include multiple headings, subheadings, and/or sub-subheadings. The view may be based on the source, the particular content received and/or recognized entities in the content. It should also be understood that the relevant content presented in the interface 300 can include text, images, audio, video, and visual content in components that may be of use for reuse by the user in the document (e.g., quotes, images, tables, etc.).

The productivity tool can include commands for a user to explore the information presented within the interface 300 and, in some cases, to insert such information into the composition surface of the productivity application.

In some cases, the assisted content authoring tool can be used to insert an outline of a topic based on the topic model associated with the information retrieved by the productivity tool. A topic model contains, as structured data, a number of properties, or attributes. The topic model can influence how the information is visually presented with information and, in some cases, influence what actions may be carried out with respect to the information. A user may copy visual content directly from the displayed information or may use the commands available to the user via the productivity tool. In some cases, a user may save or otherwise mark some of the visual content for later insertion or exploration.

Commands may be initiated by a user via, for example, selection of an icon, voice input, gestural or touch input, and the like. Example actions that the assisted content authoring tool may provide include insertion of an outline, insertion of a complete page of content retrieved for the topic, insertion of a selected portion, and insertion of a representation of an entity model. Not only can the specific content displayed in the interface 300 be inserted into the document (or other composition surface), but when the retrieved information is of structured content, specific attributes and/or entity models may be used when inserting content into the document. For example, an entity model for a person may include a picture and certain standard information about that person (e.g., date of birth, spouse(s), children, parents, etc.).

In the illustrated example, command options can include inserting an outline (331) based on the content 301 (e.g., headings, subheadings, etc. for all or some of the results in the interface 300) and inserting all (332) or some of the results in the interface 300. Selection of content view 320 can surface a menu 335 (e.g., a contextual menu, a drop-down menu, etc.) providing commands 340 for, as non-limiting examples, inserting the selected content (341), inserting an outline based on the selected content (342), deleting the selection from the content provided in the interface (343), and even exploring the selected content (344). The exploring of the selected content (344) may be initiated via a menu command such as illustrated in the figure or by some other gesture or user input, for example, by a swiping or touching of the particular information. A command to save the selected content for later (345) may also be included in the menu 335 or be initiated in some other manner. This command can be one mechanism to insert a topic anchor into the document.

A user input interface 351 for receiving a user's expression of intent may optionally remain available for a user to restart or modify their expressed intent.

Figure 4A:
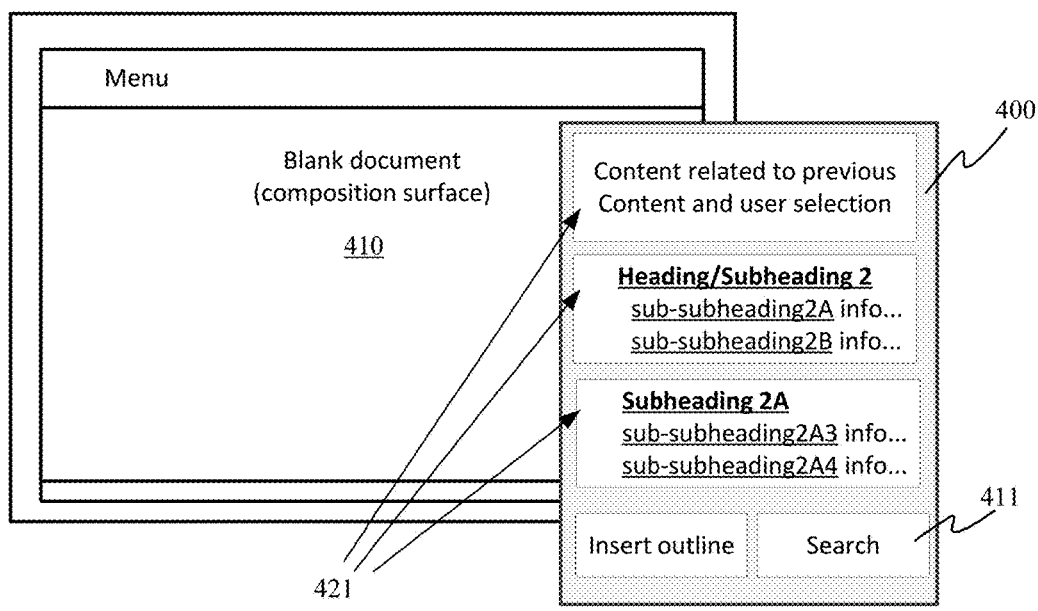
FIGS. 4A-4C illustrate a user scenario for assisted content authoring.
Figure 4B:
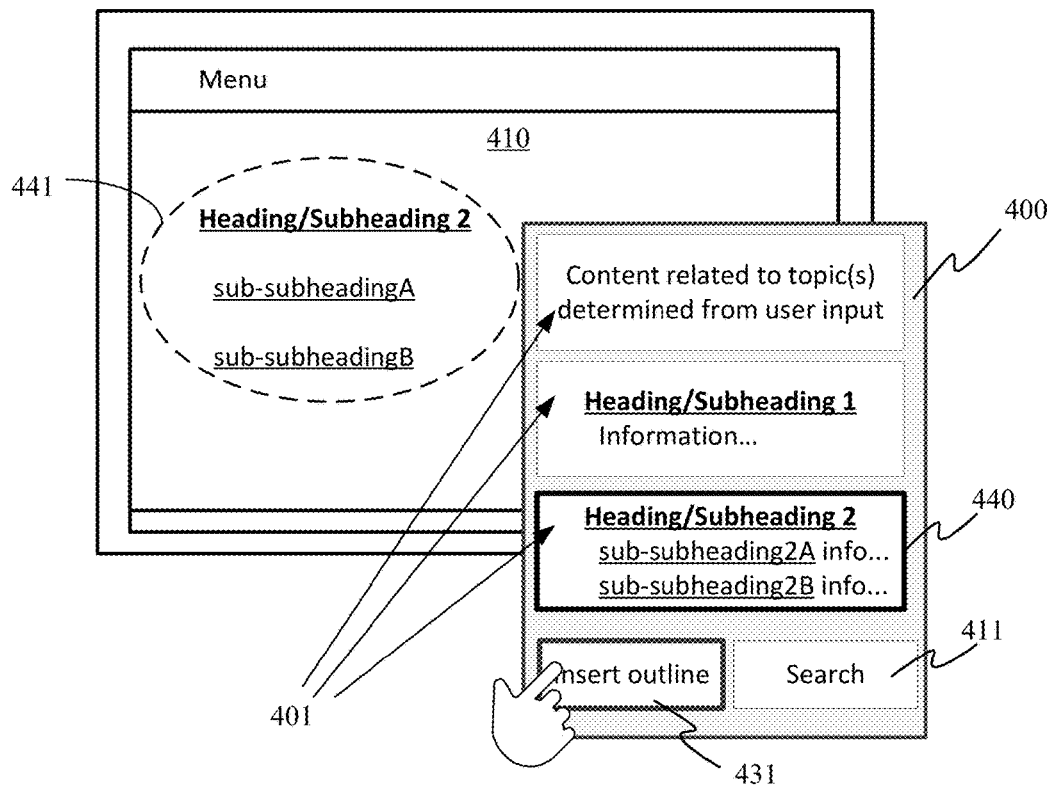
Figure 4C:
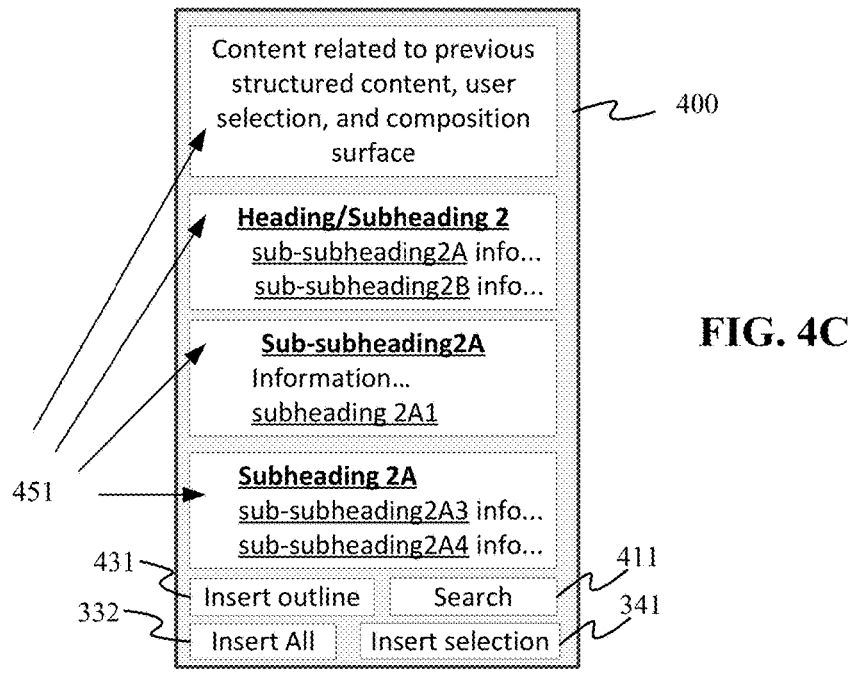

FIGS. 4A-4C illustrate a user scenario for assisted content authoring. As reflected by the representations in FIGS. 4A-4C, the interface 400 for the productivity tool for assisted content authoring may be provided on a same or different display (or device) than the interface to the productivity application or other content authoring application (e.g., the composition surface 410). In addition, the particular presentation of the information and commands may differ depending on the form factor and capabilities of the device(s) on which the content authoring application and/or interface to the assisted content authoring productivity tool are provided.

Referring to FIG. 4A, in response to receiving a command for exploration (e.g., via search command 411 or possibly explore command 344 of FIG. 3) of an item of the relevant content provided in the interface 400 (e.g., from the items shown as content 301 of FIG. 3), updated relevant content 421 can be provided, for example by a recommender engine that performs a lookup and/or search from a source accessible over a network. The lookup and/or search can involve using all of the previous content results and the user's selection to retrieve information related to at least one of the attributes and/or particular content of the previous results and the user's selection.

Advantageously, context for the exploration can be generated—even in a cold start scenario—by using the results of the previously retrieved content to refine, supplement, and even expand upon a user's initial expression of intent. Therefore, not only is the specific selection used to generate updated relevant content 421, but also the previous relevant content. Additional context of a filename or document title can also be used to supplement the search or this context may be used as the initial expression of user's intent on which the original retrieved content is based. In some cases where the user may have saved or otherwise marked some of the visual content for later insertion or exploration (e.g., through use of a topic anchor), the saved or marked content may also be used as context for the exploration.

In some cases, in response to receiving a command for exploration, the assisted content authoring productivity tool can traverse a tree (or "information graph") of linked or otherwise related information. The tree may exist at a resource, be generated during the search of content, or be a figurative tree of information resulting as the assisted content authoring productivity tool generates search queries based on the user's expression of intent and context of the previous search results (along with possible other context both available from the productivity application (or other content authoring application) and the user's additional input).

The content provided in the interface 400 can be used to present directions (of research) that the user can go. The user's selection of at least one of a portion of the targeted information, an outline of at least some of the targeted information, all of the targeted information, or some other part or portion of the targeted information presented in the interface 400 can begin a traversal of a tree that follows a path into content related to the user's selection. This process can enable users to traverse a connected set of documents, iteratively refining the set and addressing the issue where there may not be sufficient context available directly from the authored content.

The refining does not necessarily require a narrowing of results. Rather, based on the entity type (e.g., article, movie, book, people, recipe, etc.) of the topic(s) and entity in the expression of intent and/or selected result, a guided search can be presented. The exploration search conducted by the assisted content authoring tool uses the results and the context of the entire document (and prior results) to direct, expand, pivot and otherwise traverse paths of information. Each selection by the user can be leveraged.

While the exploration is taking place, the composition surface 410 may remain in the blank and/or cold start state. For cases where the user decides to insert some of the content and/or begin inputting content into the composition surface 410, that content can be used as context for a recommender engine (and the associated searching being conducted to provide exploration results in the interface 400). For example, referring to FIG. 4B, in response to receiving a selection to insert an outline (e.g., via insert outline command 342 of FIG. 3 or a search command 431—with or without a pre-selection of a particular content view 440), the heading(s) and subheadings from the relevant content may be provided to the composition surface 410 and displayed as an outline 441 to the user within the composition surface 410.

For instance, a user may be writing a paper on "Hamlet" by William Shakespeare. The initial relevant information 401 retrieved by the assisted content authoring productivity tool can include the content available from Wikipedia and include headings/subheadings such as: Characters, Plot, Sources, Date, Analysis and Criticism (critical history, dramatic structure, and language), Context and Interpretation (religious, philosophical, psychoanalytic, feminist), and Performance history (Shakespeare's day to the Interregnum, restoration and 18$^{th}$ century, 19$^{th}$ century, 20$^{th}$ century, Film and TV performances). Thus, when a user selects to insert the outline (e.g., via insert outline command 431), all or some (or selected) ones of these headings and subheadings may be inserted in to the composition surface 410 as outline 441.

Content may be input to the composition surface 410 from the interface 400 as well as through input mechanisms available from the content authoring application (e.g., copy and paste, input of text via a keyboard, input via a web clipper, and speech recognition as some examples). Accordingly, a user may use the outline inserted into the composition surface 410 and/or input additional content to the composition surface 410 while also continuing to explore topics using the assisted content authoring tool. In addition, as illustrated in, and described in more detail with respect to, FIGS. 12C-12M, a user may insert a topic anchor instead of (or in addition to) directly inserting the outline or content into their document.

Referring to FIG. 4C, the outline 441 and any other content input to the composition surface 410 may be used as context along with the previous content results to generate a further updated relevant content 451. The exploration may be as a result of the insertion of the outline, a user's selection (for insertion) of content from the interface 400 (where this occurs, the selection can also be used to garner the further updated relevant content), a user's command to further search (e.g., via search command 411), insertion of one or more topic anchors, or a combination thereof.

As a content author gains momentum in a document, context grows as well. The text in the document provides a rich area for contextual information. In an incremental authoring scenario, the user has some content in their document and then can access the assisted authoring tool. The content that the user has in the document can be used to generate the relevant content results. Entities may be identified from the content authored in the composition surface and used to yield high value research results. The structure of the document may further be used as a signal to yield additional results. For example, given a document which contains a structure of an outline, the context of the content within a particular section of the outline can be used to present insights about that section. For instance, if a user included a section about the 1960 U-2 incident on a paper about Eisenhower, the nested information (the content that relates to a linking topic of which some information is provided within the main entry) about Powers may result in an exploration about Powers and a return of an image of a bridge and information about the bridge due to the bridge being described as the one on which Powers was exchanged with a Soviet spy.

In some cases, the assisted content authoring tool can analyze the content created or otherwise input into the composition surface 410 for recognizable entities and provide additional information about the recognized entities. In one such case, the content input to the composition surface 410 can be considered the expression of intent (and a specific user input interface that is separate from the composition surface may be omitted). In some cases, a "clipping" from a web clipper can initiate the assisted content authoring tool and the clip's content can be used as the expression of intent to generate relevant content results.

The additional information and/or the recognized entity in the composition surface 410 may, when selected for exploration by a user, be another point of entry for the recommender engine to retrieve content and enable exploration by a user.

The analysis of the content in a composition surface may be performed in response to a user command. In some cases, the analysis of the content in the composition surface may be carried out in parallel to a spelling/grammar check so that recognized entities can be indicated and additional information presented about those recognized entities can be provided.

The presentation of the additional information can be helpful for a user that would like to know more about the topic they wrote about and/or find relevant content for reuse.

Figure 5:
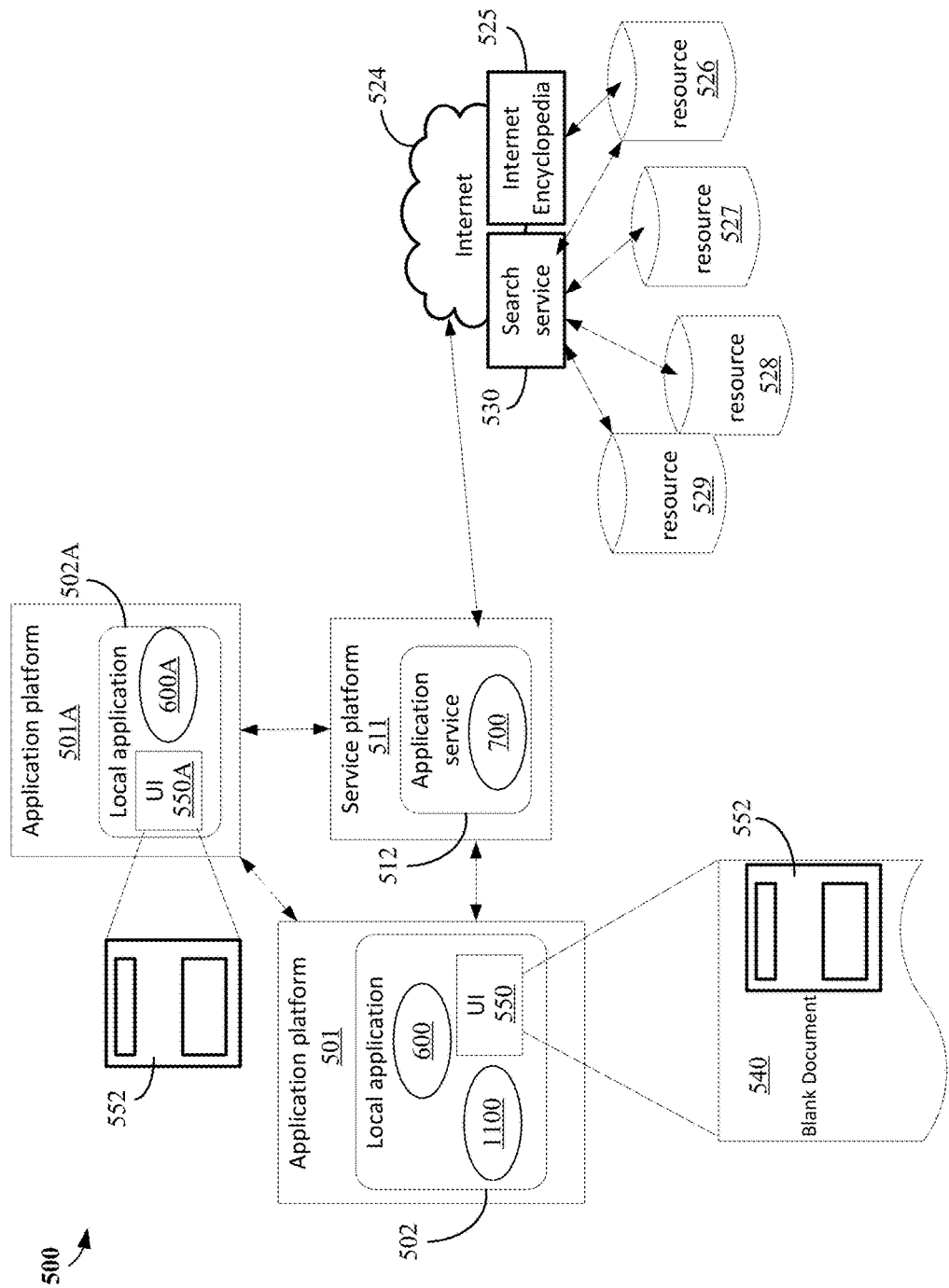
FIG. 5 illustrates service architecture and certain associated operational scenarios demonstrating various aspects of assisted content authoring.

FIG. 5 illustrates service architecture and certain associated operational scenarios demonstrating various aspects of assisted content authoring. Service architecture 500 includes application platform 501 (and/or application platform 501A) and service platform 511. Local application 502 is executed within the context of application platform 501, while application service 512 is hosted by and runs within the context of service platform 511.

Application service 512 can host, be integrated with, or be in communication with Internet resources 524 such as an Internet Encyclopedia 525 and associated content store 526 and resources (e.g., 526, 527, 528, 529) available through a search service 530, containing, for example, web sites, web pages, contacts databases, Active Directory database, lists, maps, accounts, and the like.

In some cases, local application 502 may be considered remote from application service 512 in that each are implemented on separate computing platforms. In such situations, local application 502 and application service 512 may communicate by way of data and information exchanged between application platform 501 and service platform 511 over a suitable communication link or links (not shown). In other cases, the features and functionality provided by local application 502 and application service 512 can be co-located or even integrated as a single application.

In addition to the above mentioned features and functionality available across application and service platforms, aspects of the described assisted content authoring tool can be carried out across multiple application platforms (on a same or different computing device). For example, some functionality for the assisted content authoring tool may be provided by local application 502A on application platform 501A and the local applications 502 and 502A may communicate by way of data and information exchanged between the two application platforms 501 and 501A and/or by way of data and information exchanged with the service platform 511 or other service platforms (not shown).

Figure 6A:
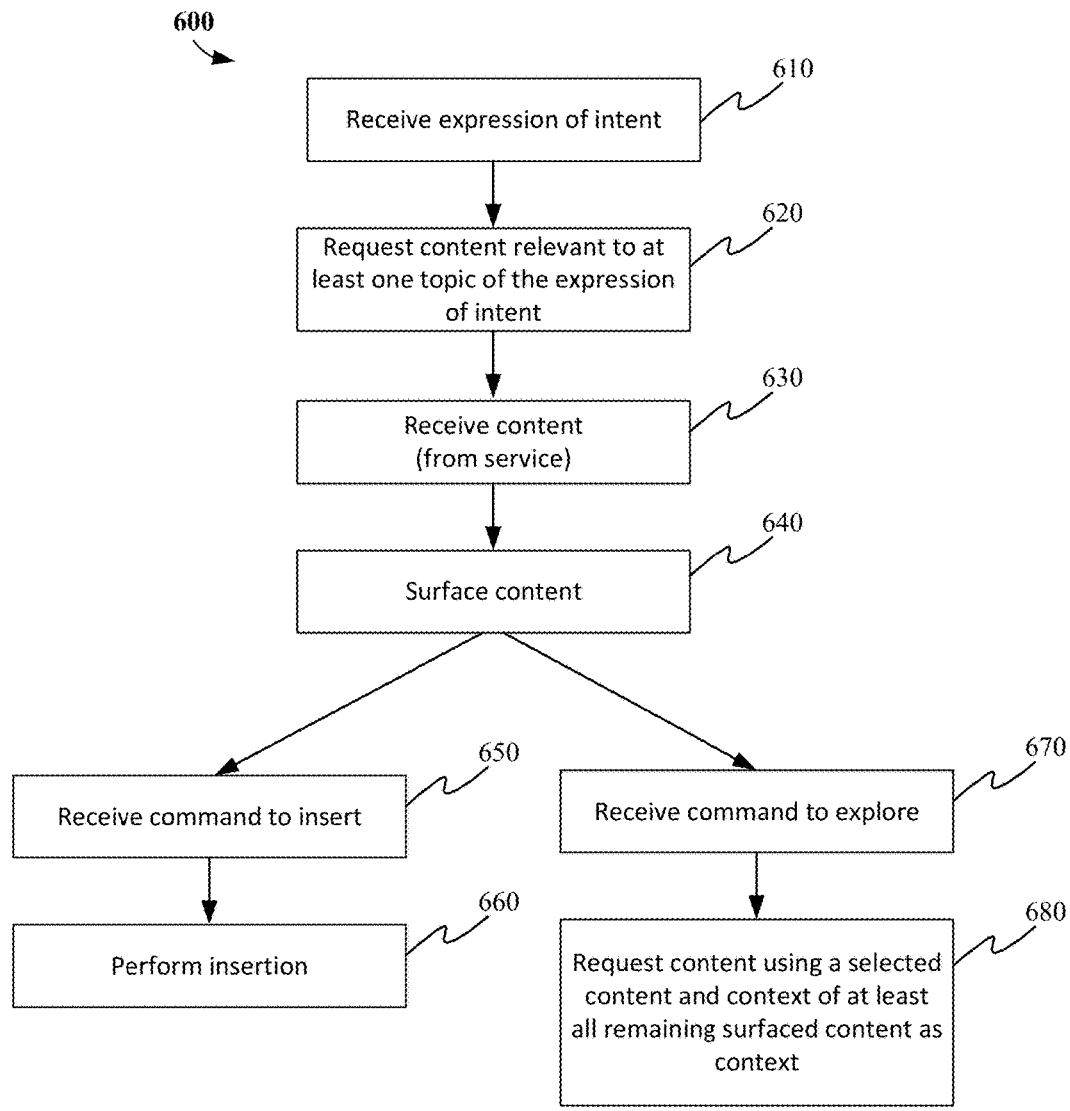
FIGS. 6A and 6B illustrate some example implementations of an assisted content authoring process that may be employed by a local application.
Figure 6B:
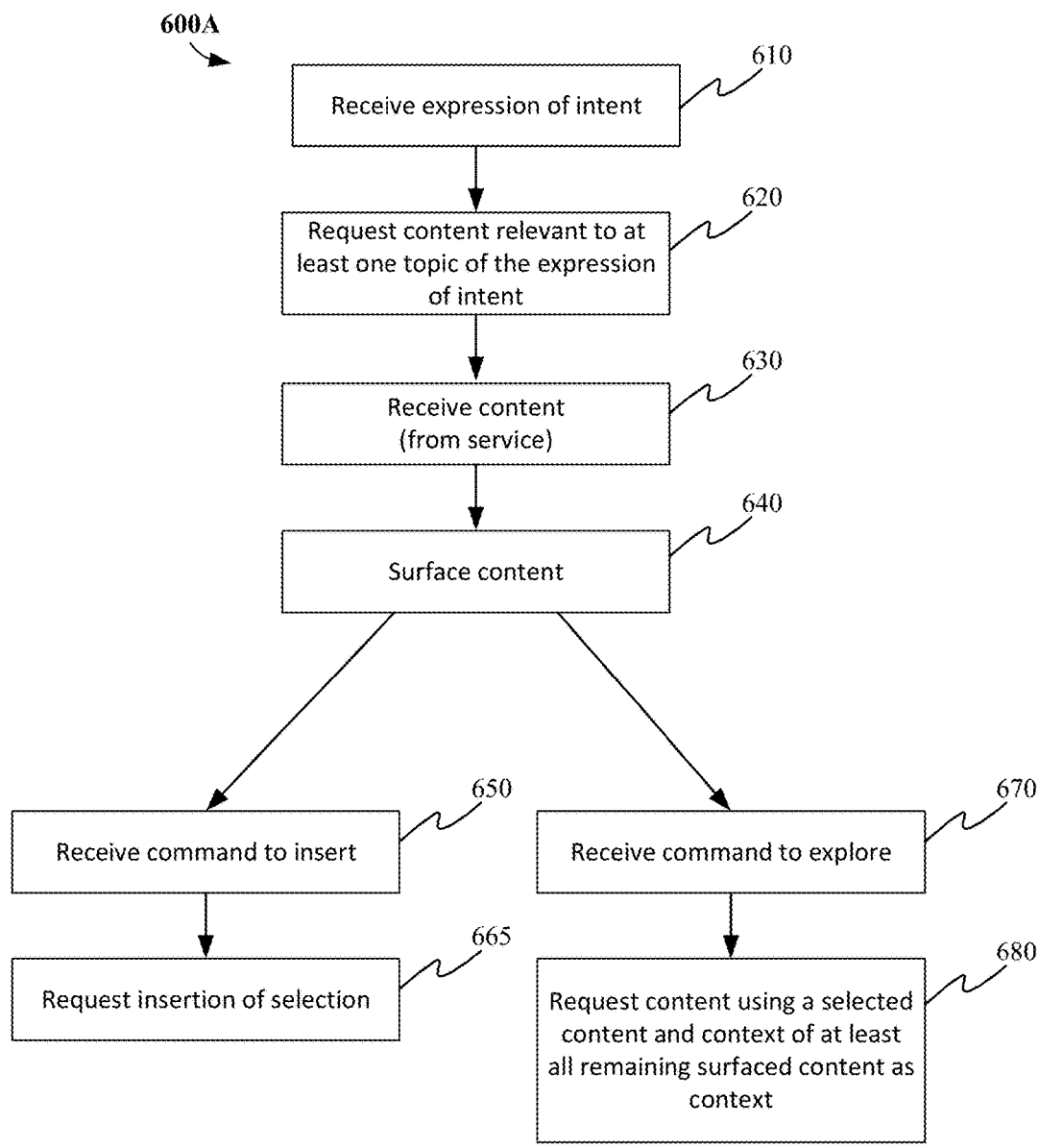
Figure 8:
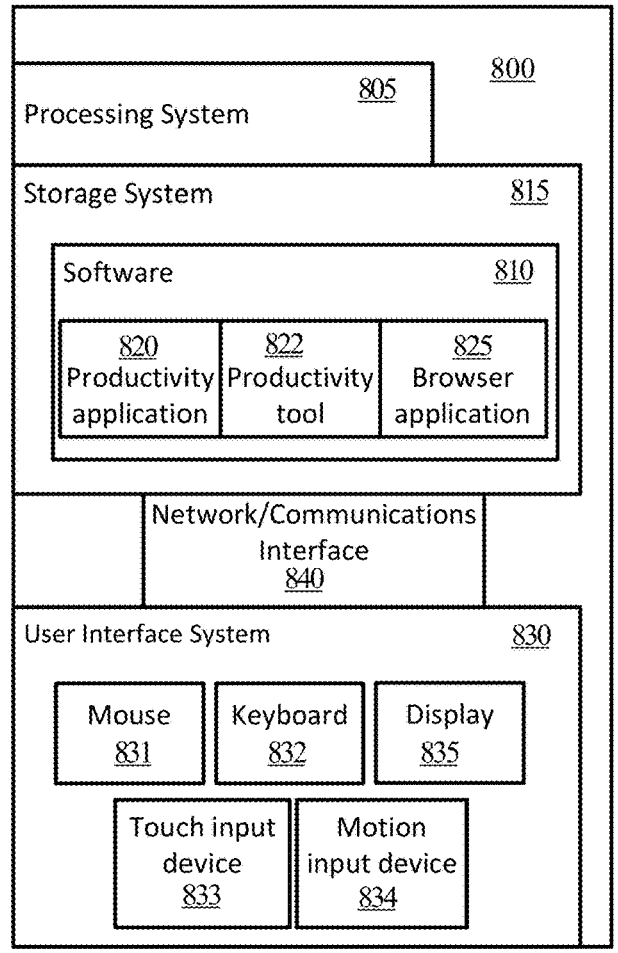
FIG. 8 illustrates components of a computing device that may be used in certain implementations described herein.
Figure 11:
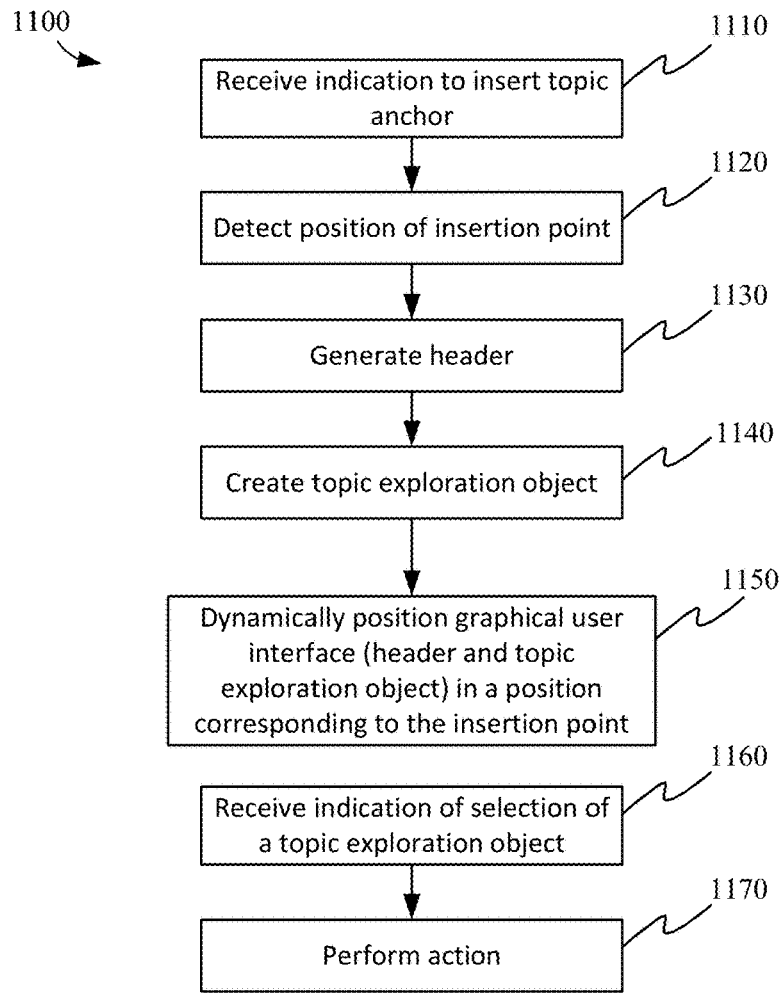
FIG. 11 illustrates an example implementation of a topic exploration user interface process that may be employed by a productivity application.

Application platforms 501 and 501A are representative of any physical or virtual computing system, device, or collection thereof capable of hosting local applications 502 and 502A (and capable of employing processes 600 and 600A respectively described with respect to FIGS. 6A and 6B and process 1100 described with respect to FIG. 11). Examples include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 800 illustrated in FIG. 8 is representative.

Local applications 502, 502A are representative of any software application, module, component, or collection thereof, capable of implementing user interface 550, 550A (and corresponding productivity tool for assisted content authoring interface 552). Examples of applications in which assisted content authoring may be provided include, but are not limited to, word processing applications, spreadsheet applications, presentation applications, web browsers, email applications, blogging and micro-blogging applications, social networking applications, and gaming applications.

Local application 502, 502A may be a browser-based application that executes in the context of a browser application. In some implementations, local application 502, 502A may execute in the context of or in association with a web page, web site, web service, or the like. However, local application 502, 502A may also be a locally installed and executed application, a streamed application, a mobile application, or any combination or variation thereof. Local application 502, 502A may be implemented as a standalone application or may be distributed across multiple applications.

Figure 7:
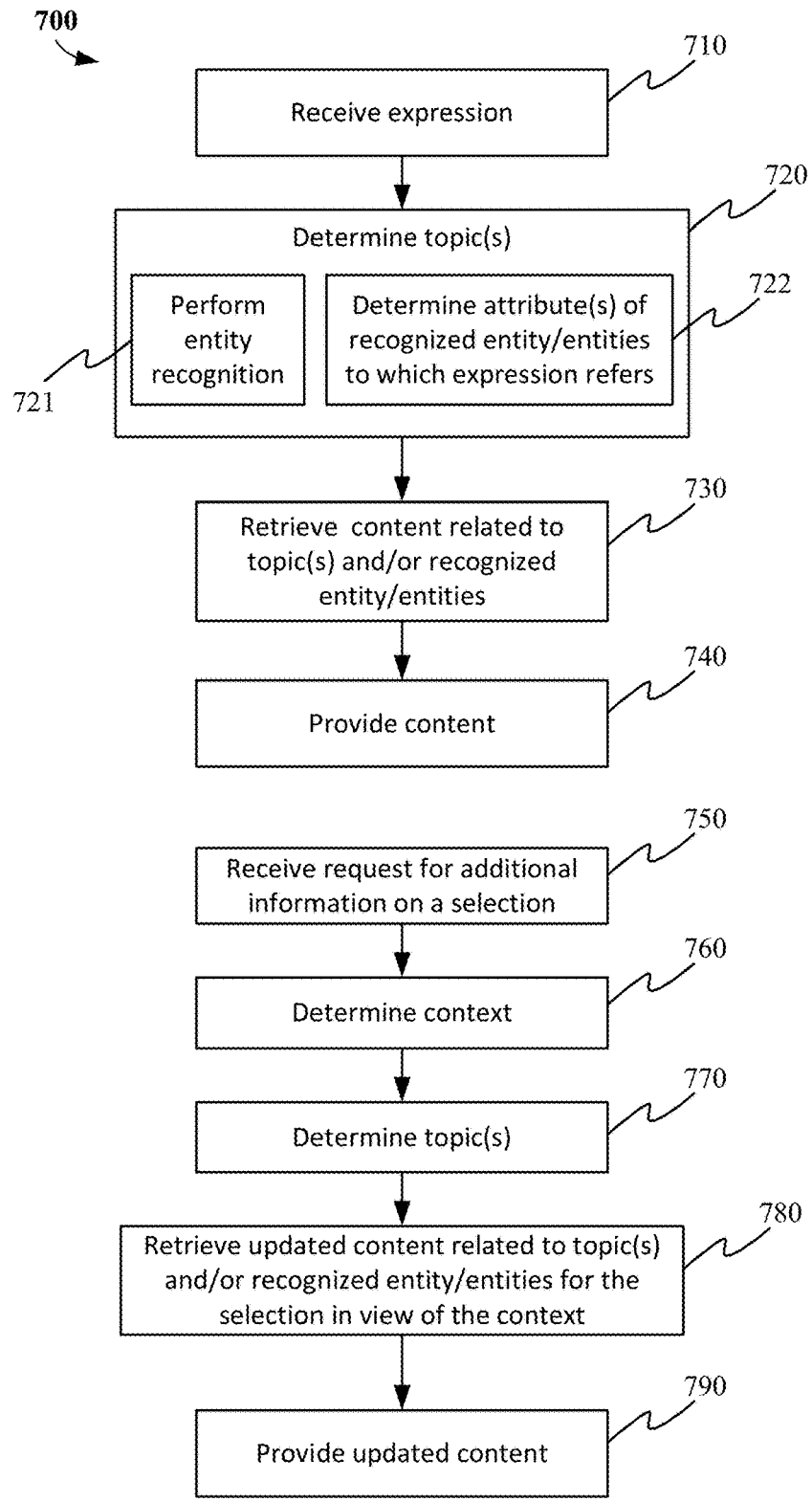
FIG. 7 illustrates an example implementation of an assisted content authoring process that may be employed by an application service.
Figure 9:
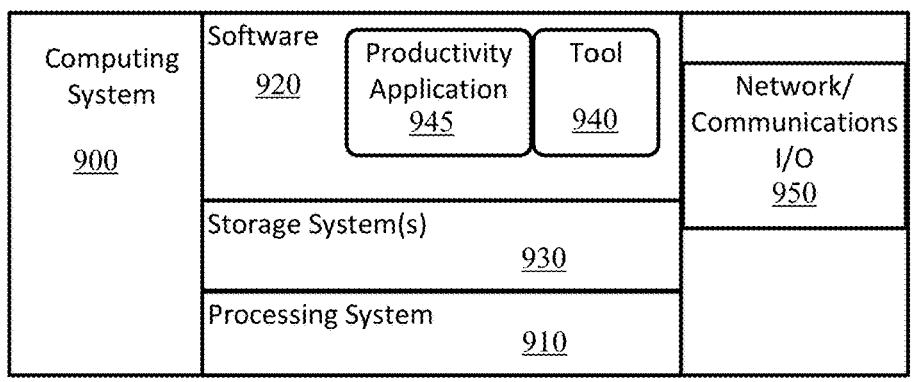
FIG. 9 illustrates components of a computing system that may be used to implement certain methods and services described herein.

Service platform 511 is representative of any physical or virtual computing system, device, or collection thereof capable of hosting all or a portion of application service 512 and implementing all or portions of process 700 described with respect to FIG. 7. Examples of service platform 511 include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing system 800 illustrated in FIG. 8 is representative. Further examples of service platform 511 include, but are not limited to, web servers, application servers, rack servers, blade servers, virtual machine servers, or tower servers, as well as any other type of computing system, of which computing system 900 of FIG. 9 is representative. In some scenarios, service platform 511 may be implemented in a data center, a virtual data center, or some other suitable facility.

Application service 512 is any software application, module, component, or collection thereof capable of providing an application service to local application 502 (and/or 502A). In some cases, application service 512 is a stand-alone application providing a productivity tool for assisted content authoring. In some cases, application service 512 includes a productivity application (or other application) for which assisted content authoring may be provided. Examples of productivity applications (and other applications) for which assisted content authoring may be provided include, but are not limited to, word processing applications, spreadsheet applications, presentation applications, web browsers, email applications, blogging and micro-blogging applications, social networking applications, and gaming applications.

In operation, local application 502 can render document 540 in user interface 550. Document 540 may be stored locally, on the "cloud," on an enterprise server, or a combination thereof. Document 540, when first created, may initially be blank. In some cases, document 540 contains content a user has already authored. An assisted content authoring tool interface 552 can surface in the user interface 550 as part of the menu/tool options of the local application or be accessible via a user interface 550A of local application 502A. It should be understood that although a "document" 540 is particularly described, document 540 may represent any file formats/types suitable for content authoring via a productivity application or other content authoring application.

The described techniques and systems can help users create well researched but original content, and beat the cold start hump by providing structure and/or placeholders for as-of-yet uncommitted content (via topic anchors) to the document first.

For the desktop experience, the program and/or tools can help create an outline, provide interactive insights, and provide easy import of facts, images and quotes. For the mobile experience, this can be an "always on" companion experience.

A cross-platform experience is possible where the experience on each platform can be optimized to make the user most effective on that platform. Platforms can include, but are not limited to, a phone, a personal computer, a smartwatch, and a browser. The browser experience can be optimized to allow users to easily link an interesting webpage to the document they are working on. The personal computer experience can help the user quickly create an outline by piecing together interesting topics into a narrative structure. The phone experience can provide an interactive way for users to select a list of topics to include in the document. The smartwatch experience may be optimized to let the user jot down quick reminders and to-dos associated with the document.

Each of these platforms can support a topic exploration experience as well as build the nucleus and structure of a document so that a user can overcome the cold start issue. The experience can be almost game-like and interactive, while in the background assembling the skeleton of a document. The mobile platforms of phone and smartwatch can even be used as a complementary device when working on a desktop personal computer.

In some cases, the exploration entry point can be an application experience instead of a pane within or part of a content authoring application such as a word processing application. This can be presented for example in the form of an app on a phone that can be used to build the nucleus and structure of the document.

In some cases, described in more detail with respect to FIGS. 11-14, an entry point to the assisted content authoring tool can be a topic exploration object.

FIGS. 6A and 6B illustrate some example implementations of an assisted content authoring process that may be employed by a local application. Referring to FIG. 6A, process 600 can be initiated when an expression of intent is received by the local application (610). The expression may be sent to the application service with a request for content relevant to at least one topic of the expression of intent (620). Potentially relevant content can be received from the application service (630) and surfaced by the local application (640). The content can be surfaced according to a content view. The content view can be a preview, template version, as-is, or a combination thereof. The content can be specifically geared towards reuse and/or research.

When the local application receives a command to insert (650), the insertion into a document (or other file) can be performed (660). Various insertion commands may be available including, but not limited to, paste, send, insert outline, insert selection, insert object, and the like. The content being inserted can be one or more of the topic results of the content or certain properties or attributes thereof.

At this stage a topic exploration object can be attached to the content and marked on the authoring surface so that an icon is displayed connected to the inserted content. It should be understood that in some cases, a topic anchor including the topic exploration object may be inserted without also inserting content directly into the document. In one of such cases, the content can be inserted into an annotation object of the topic anchor that is marked on the authoring surface.

When the local application receives a command to explore (670), a request for content relevant to a selected entity, topic, string, image, or text may be provided to the application service (680). Context can be provided to the application service to assist in the request. In some cases, the context of the previously provided content can be provided from the local application to the application service; while in other cases, the application service may keep track of the previously provided content that is used as context for the search.

Sometimes the local application through which an expression of intent is received is running on a separate platform or device than that providing an interface (e.g., composition surface) to a productivity application. In an example process 600A as illustrated in FIG. 6B, the expression of intent can be received by a local application (610), a request for content relevant to at least one topic of the expression of intent can be sent to an application service (620), content can be received from the application service (630), and the content can be surfaced in an assisted content authoring tool interface (640).

In this case, since the productivity application is on a separate application platform, when a command to insert is received by the local application (650), the local application sends a request to an application service (for the insertion of a selection (or other identified content or topic result) into a document (or other file) along with attachment of the topic exploration object (665). The application service may be an independent service for assisted content authoring or may be a service for the productivity application (either having the assisted content authoring tool or having an application programming interface (API) through which content can be inserted into an identified document (or other file). The service for the productivity application may be local or web-based.

When the local application receives a command to explore (670), a request for content relevant to a selected entity, topic, string, image, or text may be provided to the application service (680). Context can be provided to the application service to assist in the request. In some cases, the context of the previously provided content can be provided from the local application to the application service; while in other cases, the application service may keep track of the previously provided content that is used as context for the search. Selection of and/or interaction with the icon representing the topic exploration object can also be an entry point (or a return path) to the search.

FIG. 7 illustrates an example implementation of an assisted content authoring process that may be employed by an application service. Referring to FIG. 7 and process 700, an application service can receive an expression of intent from a productivity tool (710). The application service can determine one or more topics from the subject(s) of the expression (720). For example, entity recognition can be performed (721) to identify recognizable entities from the text of the expression. Attributes of the recognized entities can be determined (722), and these attributes can be used to determine one or more topics from the expression.

For instance, in response to receiving an expression of intent via the assisted content authoring tool interface 552 at the local application, the application service 512 identifies or otherwise examines the expression of intent for recognizable entities and/or domains, for example by named entity recognizers and dictionary look-ups. A domain is a category for a series of entities (or items). For example, a domain may be books. An entity refers to a concept (person, organization, location, service, temporal, numeric, monetary etc.) that a document (or other file) is discussing or describing. In the book domain example, they entity may be a specific book. The aspects are the properties or attributes of the entity that are mentioned about the entity and which may be of interest to the user. In the case of a book as an entity, the genre or the premise/plot are examples of the aspects.

A topic is any distribution of words that a human may conceivably write about. A topic can include a distribution of words that corresponds to an aspect of an entity (and sometimes the entity itself). For example, a topic may be "my favorite hobby" (an entity in a conceptual sense) or "Michael Jackson" (a named entity). A topic serves as a subject or category of related information. The topic of an expression can be used for entity disambiguation (e.g., using Latent Dirichlet Allocation (LDA) and its hierarchical variants). Entity disambiguation refers to the identifying of entities from text and their labeling with one of several entity type labels. The text can be referred to as a surface form. An entity can be referred to by multiple surface forms, and a surface form can refer to multiple entities. For example, the entity Michael Jordan may be referred to as "No. 23" and "MJ"; and the surface form "No. 23" may refer to multiple entities such as the two basketball players (Michael Jordan and Lebron James), the number 23, and the movies (23 and The Number 23).

In some cases, Wikipedia may be used as a comprehensive reference catalog for large-scale entity disambiguation. Each Wikipedia entity can have a separate page, and a vast network of internal links annotate words in the body of pages with the entities that they refer to.

The application service 512 can determine one or more topics from the (subject and/or text of the) expression of intent and identify content related to the one or more topics. For example, the application service 512 may identify the content from the data sources associated with, or accessible by, the application platform 511.

Accordingly, content related to the topics and/or the recognized entities can be retrieved (730). For instance, the application service can request a search of a resource or directly search a resource containing content. As an example, an online encyclopedia can be queried using the identified entities and topics, and the pages containing the content associated with the topic can be received for use by the assisted content authoring productivity tool.

According to an implementation, Wikipedia or other online encyclopedia can be modeled as a graph. Nodes in the Wikipedia graph represent individual Wikipedia articles. Each node is named after the title of the Wikipedia article and can include other article metadata (e.g. article length, sections, etc.). Edges in the Wikipedia graph represent a link from one Wikipedia article to another. If node A links to node B, an edge is provided between A and B. Edges can keep track of directionality of the links—i.e. an edge between A and B contains information about whether A links to B, B links to A, or both. Directionality may be accomplished through metadata on the edge or through using directed edges. In addition, a similarity score is added as a weight for each edge. That is, a weight of an edge represents how similar two articles are. In one implementation, a quantitative similarity metric can be a score indicating how many outbound links the two articles have in common. There are a number of ways to calculate the similarity metric. One method is:

$$L_{A,B} = \frac{size(S_A \cap S_B)}{size(min(S_A \cap S_B))},$$

where $L_{A,B}$ is the link overlap score between nodes A and B in a Wikipedia Graph, $S_n$ is the set of outbound links from node n, size(x) finds the size of set x, and min(x,y) returns the smaller of two sets x,y and max(x,y) returns the larger of the two sets.

Figure 10:
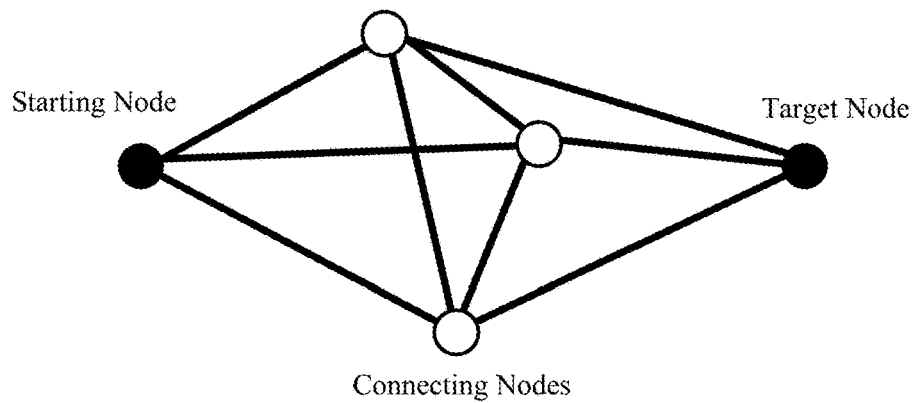
FIG. 10 shows a representation of an indirect connection cluster.

As part of the retrieval of relevant content, the Wikipedia graph can then be traversed in a manner that can suggest, based on a path through edges indicating related articles, interesting connections between a topic and/or recognized entity and other topics and/or entities. The connection between two nodes that are not directly connected, but have a clique of connecting nodes can achieve non-obvious relevant results. This structure is shown in FIG. 10.

Once the relevant content is retrieved, the relevant content can be provided to a local application having an interface to the productivity tool for assisted content authoring (740). Similarly, when the document 540 contains content, the application service can identify key terms from the information in the document 540 and use those identified key terms along with the entities identified in/subject of the expression of intent to determine one or more topics for which content is retrieved. The content in the document may contain various entries, such as text, words, strings, numbers, symbols, images and the like. An entry may be recognizable as an entity based on various characteristics.

The application service can also support exploration scenarios so that when a request for content is received (750), for example, containing a selection of specified content, a topic, entity, string, image, or text, additional information can be provided that is related to the selection. To facilitate the search and/or recommendation of related content, context can be determined (760). The context for the selection can include the previously retrieved content. In some cases, at least some of the context is provided with the request. In some cases, at least some of the context is available to the application service directly, for example by being stored in an associated resource.

The application service can determine one or more topics for exploration from the selection and the context (770). In some cases, the topic determination can involve performing entity recognition and determining attributes such as described with respect to operations 721 and 722. The application service can retrieve updated content related to the topic(s) and/or recognized entities for the selection in view of the context (780). For example, the application service can request a search of a resource or directly search a resource containing content. Once the content is retrieved, the content can be provided to a local application having an interface to the productivity tool for assisted content authoring (790). Similar to step 730, certain implementations may use a Wikipedia graph that is formed as described above to retrieve content of connected information (such as illustrated in FIG. 10).

FIG. 8 illustrates components of a computing device that may be used in certain implementations described herein; and FIG. 9 illustrates components of a computing system that may be used to implement certain methods and services described herein.

Referring to FIG. 8, system 800 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 can be used in implementing a computing device embodying application platforms 501 and 501A, a computing device having display 105, separate device 115, and the like.

System 800 includes a processing system 805 of one or more processors to transform or manipulate data according to the instructions of software 810 stored on a storage system 815. Examples of processors of the processing system 805 include general purpose central processing units, application specific processors, and logic devices, as well as any other type of processing device, combinations, or variations thereof. The processing system 805 may be, or is included in, a system-on-chip (SoC) along with one or more other components such as network connectivity components, sensors, video display components.

The software 810 can include an operating system and application programs such as a productivity application 820, productivity tool 822, and/or web browsing application 825. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Storage system 815 may comprise any computer readable storage media readable by the processing system 805 and capable of storing software 810 including the productivity application 820, productivity tool 822, and/or web browsing application 825.

Storage system 815 may include volatile and nonvolatile, removable and non-removable media implemented in any method or technology for storage of information, such as computer readable instructions, data structures, program modules, or other data. Examples of storage media of storage system 815 include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium a propagated signal or carrier wave.

In addition to storage media, in some implementations, storage system 815 may also include communication media over which software may be communicated internally or externally. Storage system 815 may be implemented as a single storage device but may also be implemented across multiple storage devices or sub-systems co-located or distributed relative to each other. Storage system 815 may include additional elements, such as a controller, capable of communicating with processing system 805.

Software 810 may be implemented in program instructions and among other functions may, when executed by system 800 in general or processing system 805 in particular, direct system 800 or the one or more processors of processing system 805 to operate as described herein.

In general, software may, when loaded into processing system 805 and executed, transform computing system 800 overall from a general-purpose computing system into a special-purpose computing system customized to retrieve and process the information for facilitating content authoring as described herein for each implementation. Indeed, encoding software on storage system 815 may transform the physical structure of storage system 815. The specific transformation of the physical structure may depend on various factors in different implementations of this description. Examples of such factors may include, but are not limited to the technology used to implement the storage media of storage system 815 and whether the computer-storage media are characterized as primary or secondary storage.

The system can further include user interface system 830, which may include input/output (I/O) devices and components that enable communication between a user and the system 800. User interface system 830 can include input devices such as a mouse 831, track pad (not shown), keyboard 832, a touch device 833 for receiving a touch gesture from a user, a motion input device 834 for detecting non-touch gestures and other motions by a user, a microphone for detecting speech (not shown), and other types of input devices and their associated processing elements capable of receiving user input.

The user interface system 830 may also include output devices such as display screens 835, speakers (not shown), haptic devices for tactile feedback (not shown), and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display 835 in myriad ways, presenting graphical user interface elements, text, images, video, notifications, virtual buttons, virtual keyboards, or any other type of information capable of being depicted in visual form.

The user interface system 830 may also include user interface software and associated software (e.g., for graphics chips and input devices) executed by the OS in support of the various user input and output devices. The associated software assists the OS in communicating user interface hardware events to application programs using defined mechanisms. The user interface system 830 including user interface software may support a graphical user interface, a natural user interface, or any other type of user interface. For example, the interfaces for the productivity application and/or the productivity tool for assisted content authoring (and corresponding functionality) described herein may be presented through user interface system 830.

Communications interface 840 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Computing system 800 is generally intended to represent a computing system with which software is deployed and executed in order to implement an application, component, or service for a productivity tool for assisted content authoring as described herein. In some cases, aspects of computing system 800 may also represent a computing system on which software may be staged and from where software may be distributed, transported, downloaded, or otherwise provided to yet another computing system for deployment and execution, or yet additional distribution.

Certain aspects described herein, such as those carried out at service platform 511 may be performed on a system such as shown in FIG. 9. Referring to FIG. 9, system 900 may be implemented within a single computing device or distributed across multiple computing devices or sub-systems that cooperate in executing program instructions. The system 900 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 900 can include a processing system 910, which may include one or more processors and/or other circuitry that retrieves and executes software 920 from storage system 930. Processing system 910 may be implemented within a single processing device but may also be distributed across multiple processing devices or sub-systems that cooperate in executing program instructions.

Storage system(s) 930 can include any computer readable storage media readable by processing system 910 and capable of storing software 920. Storage system 930 may be implemented as a single storage device but may also be implemented across multiple storage devices or sub-systems co-located or distributed relative to each other. Storage system 930 may include additional elements, such as a controller, capable of communicating with processing system 910. Storage system 930 may also include storage devices and/or sub-systems on which data such as entity-related information is stored.

Software 920 may be implemented in program instructions and among other functions may, when executed by system 900 in general or processing system 910 in particular, direct the system 900 or processing system 910 to operate as described herein for assisted content authoring (as assistance tool 940) and/or providing a productivity application 945.

System 900 may represent any computing system on which software 920 may be staged and from where software 920 may be distributed, transported, downloaded, or otherwise provided to yet another computing system for deployment and execution, or yet additional distribution.

In embodiments where the system 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 950 may be included, providing communication connections and devices that allow for communication between system 900 and other computing systems (not shown) over a communication network or collection of networks (not shown) or the air.

Certain techniques set forth herein with respect to assisted content authoring may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered computer-readable "storage media."

By way of example, and not limitation, computer-readable storage media may include volatile and non-volatile, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of carrier waves or propagating signals.

One of the challenges for content creation is the starting from a blank page. User research indicates that the inertia from staring at an empty white canvas can hinder user productivity. This is known as the "Cold Start" problem. When users express an intent to write about something, the productivity tool suggests possible topics to write about.

According to certain implementations of the described productivity tools and applications, the user does not have to select text or even enter text into a search bar. Rather, there is a graphical user interface element provided that can be marked on a user's document in association with a specific topic and that functions as an entry point to an information pane experience such as described with respect to FIGS. 2A-7. The topic exploration object provides a place-holder section and easy access to further information about the topic. Interesting web articles and/or artifacts as well as user-created notes and markup may be added to this place-holder section. The topic exploration object can act as a reminder to the user and provide a contextual menu item with a command that can be considered a request to do a search on the topic. In many cases, the search is requested to the productivity tool described herein. The topic exploration object is not a specific web result, rather it is a dynamic graphic user interface that is marked on the document's authoring/composition surface in a position that is tied to a particular insertion point on the document.

A "content element" refers to any part of electronic content that is defined or discernable as a part. For example, a content element may be automatically discerned from a characteristic of the content element itself (e.g., a paragraph of an electronic document, or a file format designation) or may be manually defined by a user (e.g., a user-selected collection of words in an electronic document or a user-selected portion of a digital image). Content elements may include format data such as, for example, position information describing the placement of other content elements, or information specifying colors or fonts to be used in rendering other content elements.

An item may be "associated" with electronic content. Examples of such association comprise inclusion within a file or other data structure containing the electronic content, the presence of a direct or indirect reference to the content element within electronic content, or the presence of a data structure, file, or other mechanism by which a content element is associated with electronic content.

A "topic exploration object" may be associated with one or more content elements in an electronic document. In a specific implementation, the topic exploration object is associated with a title element. A title element is a content element that includes a title from content that may have been received from an online resource. Since the text of multiple title elements that are inserted into a document take an appearance of an outline, the title element may also be referred to as a header (or subheader) and therefore such usage should be understood to refer to the same concept.

A topic exploration object can include a data structure having at least a location reference field and a topic content field. The location reference field is used to provide a reference to the portion of the electronic document associated with the topic exploration object. There can be numeric, alphanumeric, and/or contextual information to facilitate the identification of the portion (paragraph, line, character, and the like) of the electronic document to which the topic exploration object is indicated as being associated ("marked").

The topic content field can contain the preview and/or other brief topic information associated with the topic exploration object data structure. The topic content preview and/or other brief topic information may take various forms including, but not limited to, text, drawings, graphics, pictures, audio, video, and the like. The topic content preview and/or other brief topic information may even include other objects such as equations, tables, an email object, a word processing object, a web page object, a spreadsheet object.

The topic exploration object can further include an annotation field or object. The annotation field or object can provide an interface in which users can add their own notes or markup. This interface can be a 'dumping ground' for amorphous content a user wants to add to the document. The amorphous content can include images, user-entered notes, bullet points, citation links, etc. In some cases, the annotation object can be implemented as a comment object (e.g., as a user-inserted note about the topic for the document) that is tied to the topic anchor.

The topic exploration object has a particular action associated therewith. The action involves an operation requesting information on the topic identified by the topic exploration object. In some cases, the indicator for this particular action is stored in an action field of the data structure. The action field can indicate to the application the command that should be executed (e.g., the request for information).

FIG. 11 illustrates an example implementation of a topic exploration user interface process that may be employed by a productivity application. The described process 1100 displays a graphical user interface control that is represented as an icon or balloon providing a function accessible via the graphical user interface control, namely a command for a request for information relevant to the topic identified by the placement of or the particular information displayed as part of the graphical user interface control. In particular, according to certain implementations, in response to receiving an indication of an insertion of a topic anchor (1110), a position of an insertion point is detected (1120). The insertion point may be represented by a cursor. The cursor insertion point may be generally thought of as an "active point of editing" in an electronic document and does not necessarily have to be represented using a cursor. Those of ordinary skill in the art will recognize various mechanisms to track and present the active point of editing and use such information to implement the methods and systems described herein.

A graphical user interface control is dynamically positioned in a position corresponding to the position of the insertion point (1150). "Dynamically positioned" or "dynamically repositioned" involves positioning a graphical user interface control where the user interface control is always present in some form (unless specifically hidden or removed) and tracks, or follows, the position of the insertion point in the electronic document as the insertion point is moved. The graphical user interface control can include a title element (e.g, header) and a topic exploration object. In some cases the header (i.e. the visual display of the title) may be omitted. When dynamically positioning the graphical user interface control, the application inserts the header/subheader and hangs the topic exploration object off the header/subheader to function as an entry point to an information pane experience for that topic.

In many cases, the graphical user interface control includes the header to which the topic exploration object is associated. Accordingly, a topic header can be generated (1130) for the graphical user interface control. According to certain implementations, the topic header, providing a title element, is generated from a selected content result, which was subject to the command indicating insertion of the topic anchor. The selected content result can be selected from an information pane of the productivity tool as described herein. Here, the application takes the content result and identifies the title for the content result and uses that title to generate the topic header.

In addition, a topic exploration object is created from the selected content result (1140). The topic exploration object can include the title or other metadata associated with the result in a manner that persists so that the user can see what they have inserted, for example in the form of a snippet, an image, and the like. Creating the topic exploration object may involve several actions, such as allocating memory, defining a row in a database table, calling a stored procedure in a database, calling an Application Programming Interface (API) function, or the like.

As mentioned above, the topic exploration object may have a data structure that includes a location reference field and a topic content field. Associating the topic exploration object with the insertion point may include actions to populate a location reference field with particular information to uniquely identify the portion of the electronic document associated with the topic exploration object. In addition, the creation of the topic exploration object can further involve populating the topic content field with a preview and/or other content provided with the result displayed in the information pane. Some portions of the data structure, such as the content of the topic content field are presented to a user viewing the document. Other portions of the data structure (and information contained therein) may not be presented to the user viewing the document, but may be indirectly presented to the user. For example, the location reference field may be used to highlight the portion of content associated with the topic exploration object. This portion of content may be the header that is inserted into the document with the topic exploration object and/or content elements nearby or otherwise selected.

When the graphical user interface control is dynamically positioned in a position corresponding to the position of the insertion point (1150), the header is inserted at the position corresponding to the position of the insertion point and the topic exploration object "hangs from" or is otherwise visually represented as being connected to the header. When a user manipulates the cursor insertion point and/or the inserted header through the use of keyboard, mouse, or touch actions (or other activities affecting the format or positioning of content in the document), the topic exploration object is dynamically repositioned to correspond with the position of the cursor insertion point and/or header.

In an embodiment, the topic exploration object is presented in a margin of the electronic document. In certain embodiment, the topic exploration object is presented in a vertical position aligning with the insertion point so that the topic exploration object is at a same eye-level as the insertion point. When a header is included in the document, the topic exploration object may then at a same or similar vertical position on the page as the header. The position of the topic exploration object may, in some embodiments, be configurable. For example, the topic exploration object may be positioned in the left margin or the right margin, depending on a user's preference.

The topic exploration object provides a command icon/interface for a request for additional information on a topic.

Thus, in response to receiving an indication of a selection of the topic exploration object (1160), the action associated with the topic exploration object is performed (1170). For example, the application (based on the instructions associated with the action field of the topic exploration object) can invoke the processes for assisted content authoring. This may entail providing information associated with the topic exploration object (e.g., the identified topic and/or other information associated with the topic content field of the topic exploration object) with the request for additional information so that content related to the topic can be retrieved (e.g., operations 620 and 630 described with respect to FIGS. 6A and 6B). Other actions and functionality may be available to the topic exploration object.

The topic exploration object can be created in response to a request for a topic anchor. The topic anchor can provide an intermediate state where content has been saved, but not committed to a specific location in the document. For example, by including an annotation field or object, a user can add amorphous content—notes (text, images, etc.) and markup—that may later be used to draw content or ideas from. Even without any additional content provided in an annotation field or object, the topic anchor includes a title/header that enables a user to easily refer back to the topic anchor to draw content or ideas from. The topic anchor thus can serve as an entry point to an experience that allows users to find yet more content that they can import and add into the anchor object (and the document itself).

Figure 12A:
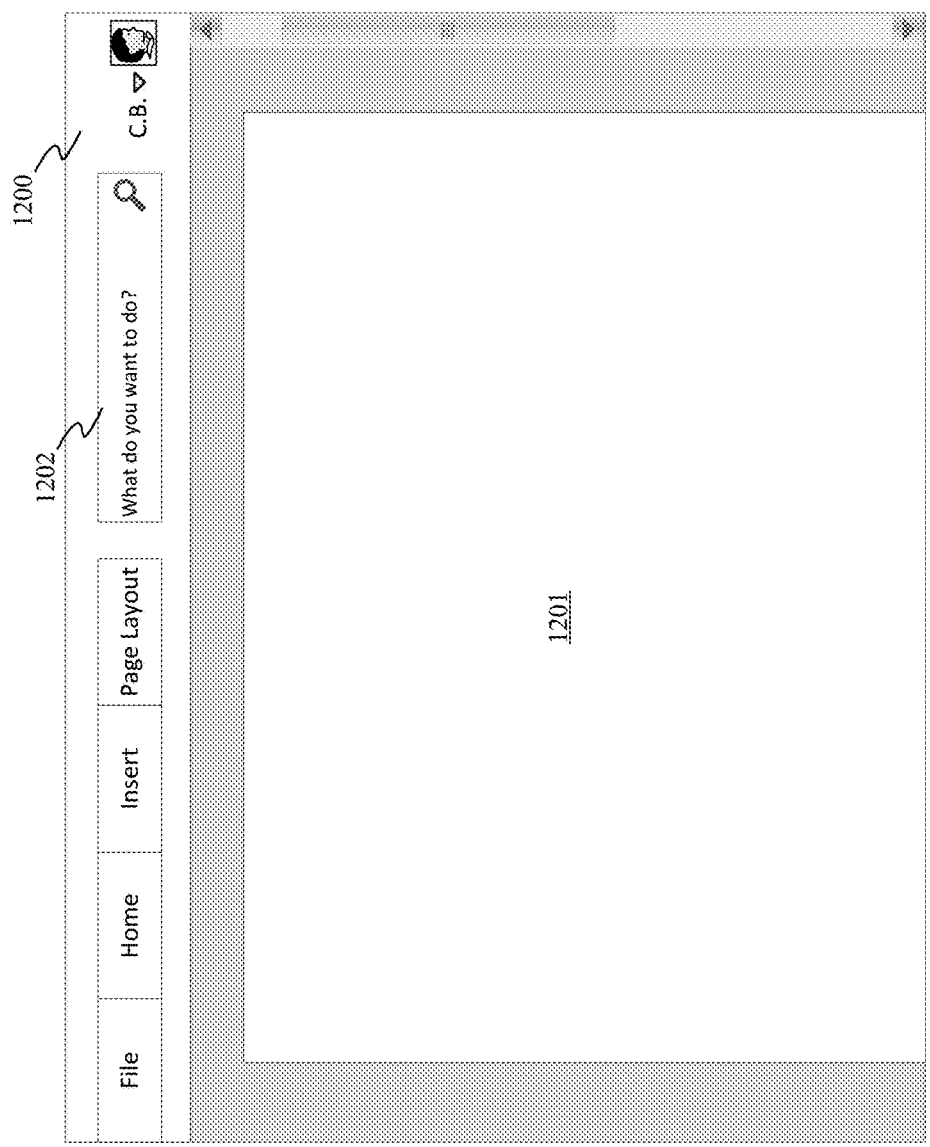

FIGS. 12A-12M illustrate a graphical user interface and corresponding actions taken by a productivity application providing a topic exploration object. Referring to FIG. 12A, in a graphical user interface 1200 of a word processing productivity application, an initial state may be a blank or new document 1201 (e.g., a default state for a "new" document). For this illustrative scenario, the user wants to write an essay about the Apollo Program. The graphical user interface 1200 for the word processing productivity application can include a search bar 1202 (or other user input interface to assisted content authoring such as 102, 112).

Figure 12B:
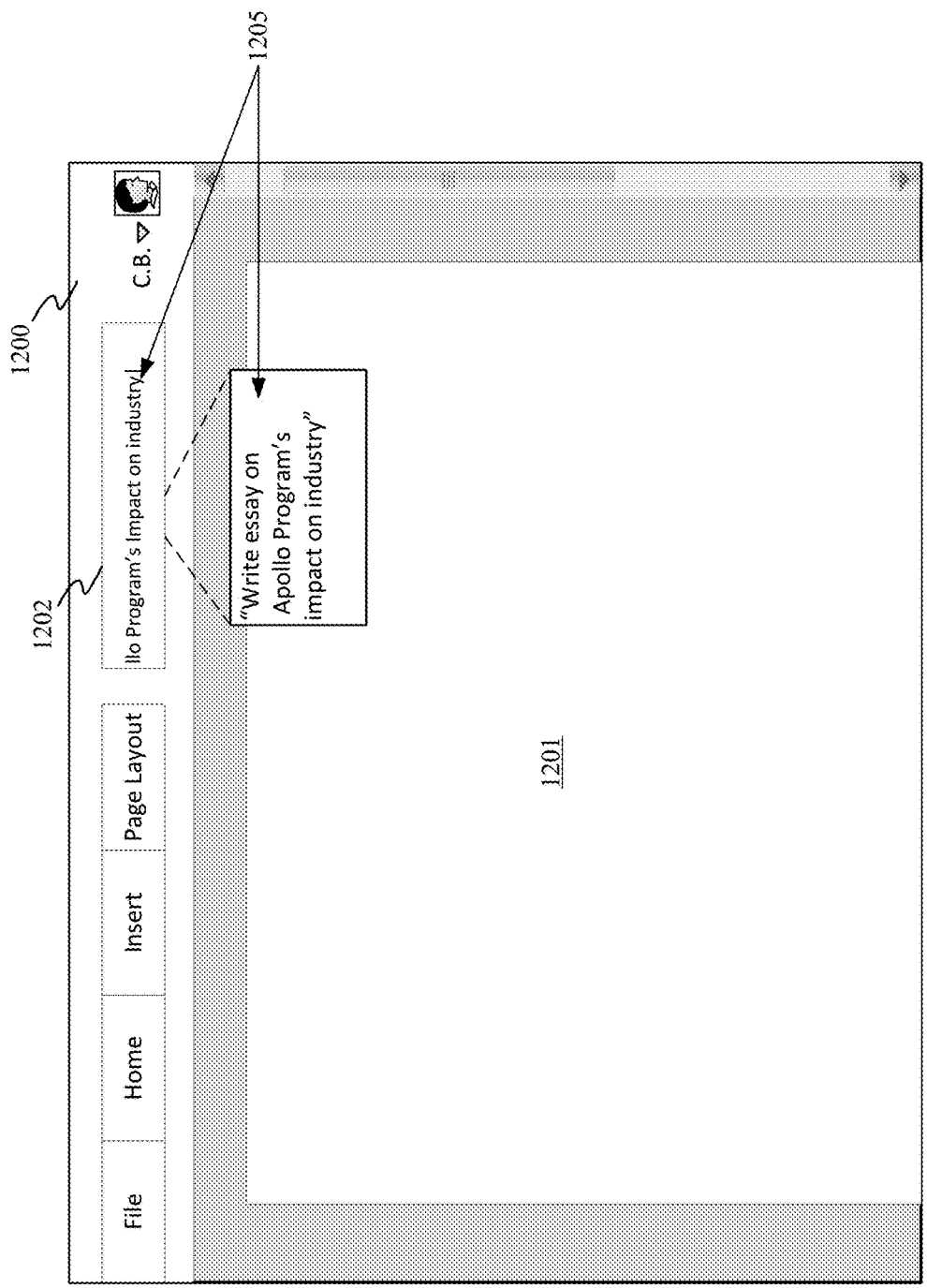
Figure 12C:
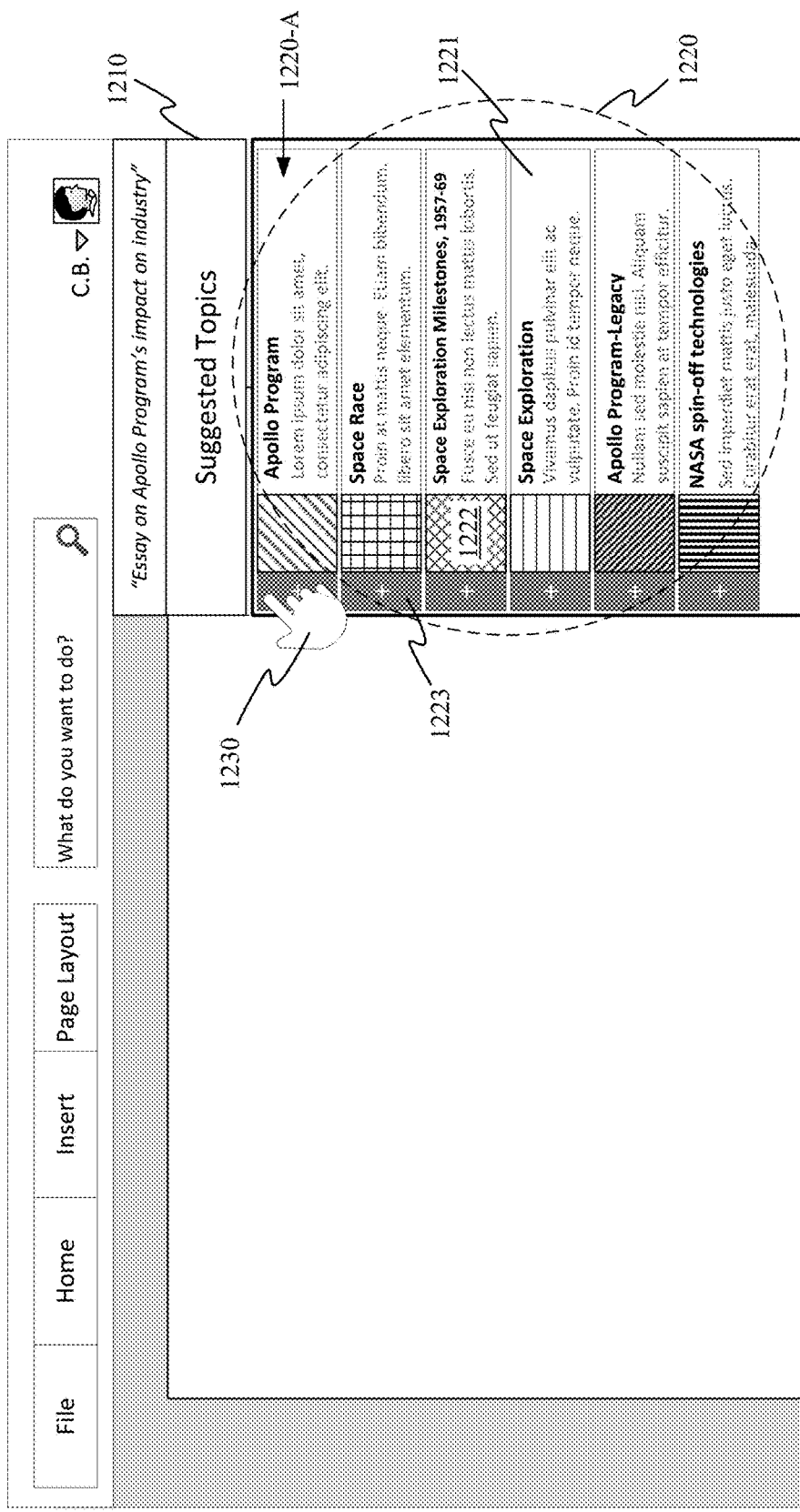

As illustrated in FIG. 12B, the user can type their intent for writing an essay on the Apollo program (e.g., "Write essay on Apollo Program's impact on industry"). The application can receive the expression of intent 1205 and either implicitly by receipt of the expression 1205 or by express command, generate information relevant to the user's intent for the document (e.g., suggested topics). For example, as illustrated in FIG. 12C, content, for example from a source such as Wikipedia may be provided in an information interface 1210. The example results include articles on topics including "Apollo Program", "Space Race", "Space Exploration Milestones, 1957-69", "Space Exploration", "Apollo Program-Legacy", and "NASA spin-off technologies". These articles on suggested topics can be provided in the form of preview graphic icons 1220 (or informational components and content views 310, 320 such as described with respect to FIG. 3) that can include a preview of the article 1221, an image 1222 (if available), and control/command features such as add topic 1223, expand (not shown), or other action (such as any commands described with respect to FIGS. 3 and 4).

Figure 12D:
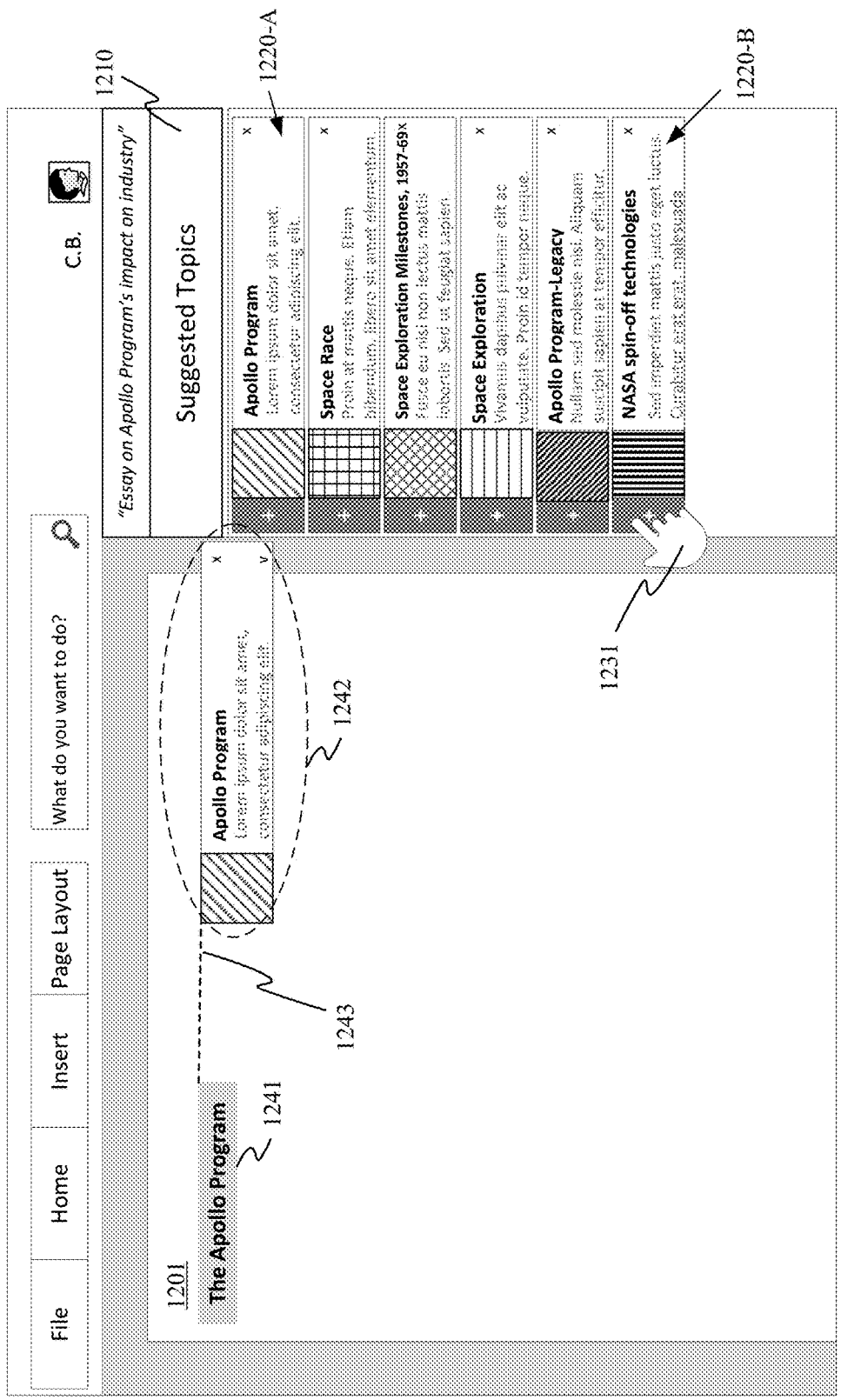

The user can pull in suggested topics that she would like to write about into the document by clicking, for example, on an add topic command 1223 (+button). For example, the user may click 1230 on the add command 1223 in the preview graphic icon 1220-A for the topic entitled "Apollo Program". According to an implementation, as illustrated in FIG. 12D, in response to receiving an indication of a command to add a topic to the document, the application can create a header 1241 in the document with a suggested title (e.g., operation 1104), for example by using a title from the article. In this case, since the user selected the topic represented by 1220-A, the topic title 1241 of "The Apollo Program" is inserted into the document 1201. This insertion can be similar to the insertion of the headings of the outline 441 described with respect to FIG. 4.

Advantageously, in addition to inserting a title, a graphical user interface is dynamically positioned to correspond to the position of the insertion point of the title/heading 1241. In particular, this graphical user interface has a topic exploration object 1242 that can be marked (e.g., with a connecting line 1243) on the content authoring surface as attached to the header 1241 (and extending onto a margin of the document) (e.g., operation 1150). This topic exploration object 1242 is not part of the final document, but acts as a portal to the information pane experience for that topic (see FIG. 12F). This graphical user interface of a topic exploration object can be expressed in a similar fashion as "comments" in a word processing application such as MICROSOFT WORD. For example, the topic exploration object can be displayed in a margin of a document and attached to specific text or a string in the document.

Figure 12E:
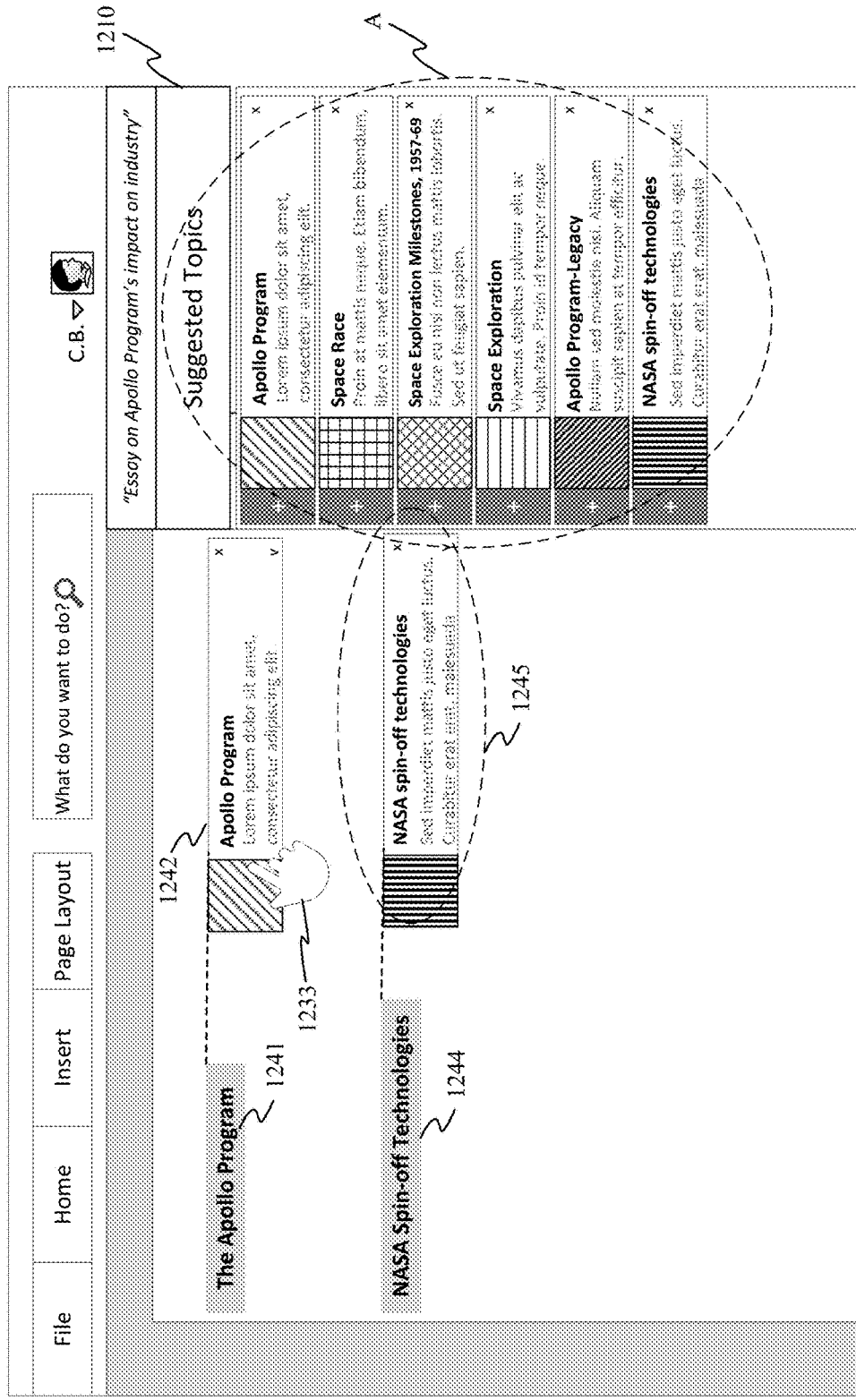

Each header (generated by clicking on the +button) adds to a cold start outline in the document. For example, the user may click 1231 on the add command in the preview graphic icon 1220-B for the topic entitled "NASA spin-off technologies". According to an implementation, as illustrated in FIG. 12E, in response to receiving an indication of a command to add a topic to the document, the application can create a header 1244 in the document with a suggested title, for example by using a title from the article. In this case, since the user selected the topic represented by 1220-B the topic title 1244 of "NASA spin-off technologies" is inserted into the document 1201 and a topic exploration object 1245 is connected to the header 1244 to enable a portal to further exploration of the topic NASA spin-off technologies. As can be seen in FIG. 12E and in the progression in the subsequent figures, the inserting of these headers (1241, 1244, . . . ) creates an outline in the document.

The topic exploration objects enable a user to return to the information pane experience for that topic at any time. For example, a user can click on the topic exploration object to explore and bring in to the document additional information, drawing inspiration from the knowledge within to write their document. In the example shown in FIG. 12E, the user has clicked 1233 on the "Apollo Program" topic exploration object 1242. This results in a change of state for the information pane 1210, for example from the state A to reveal the state B as shown in FIG. 12F.

The change of state may be a new pane (or opening of a new information pane when the previous state is where the information pane is hidden or not present). The change of state may be from a previous listing of relevant information (related or unrelated to the topic selected by the user for further exploration).

Figure 12F:
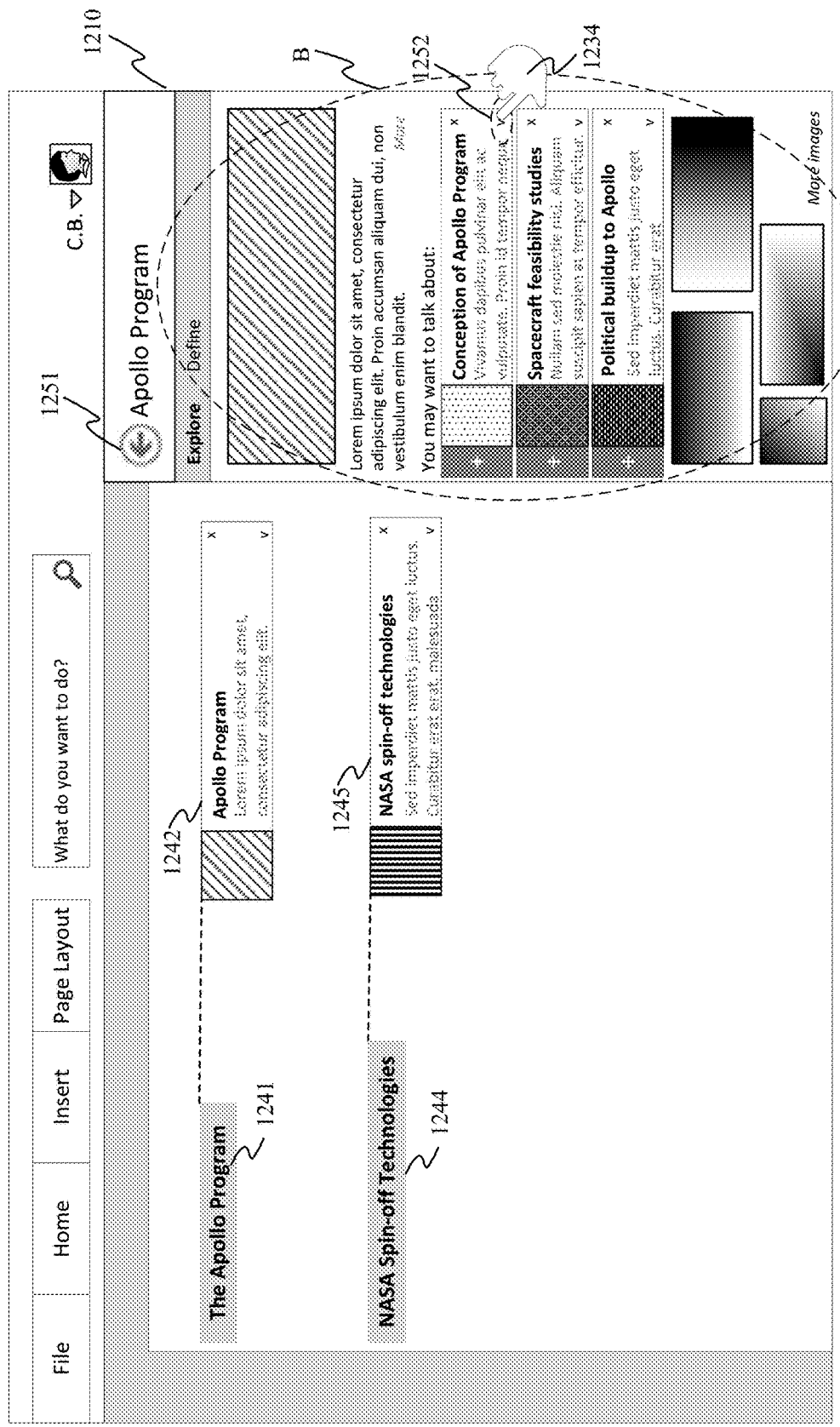
Figure 12G:
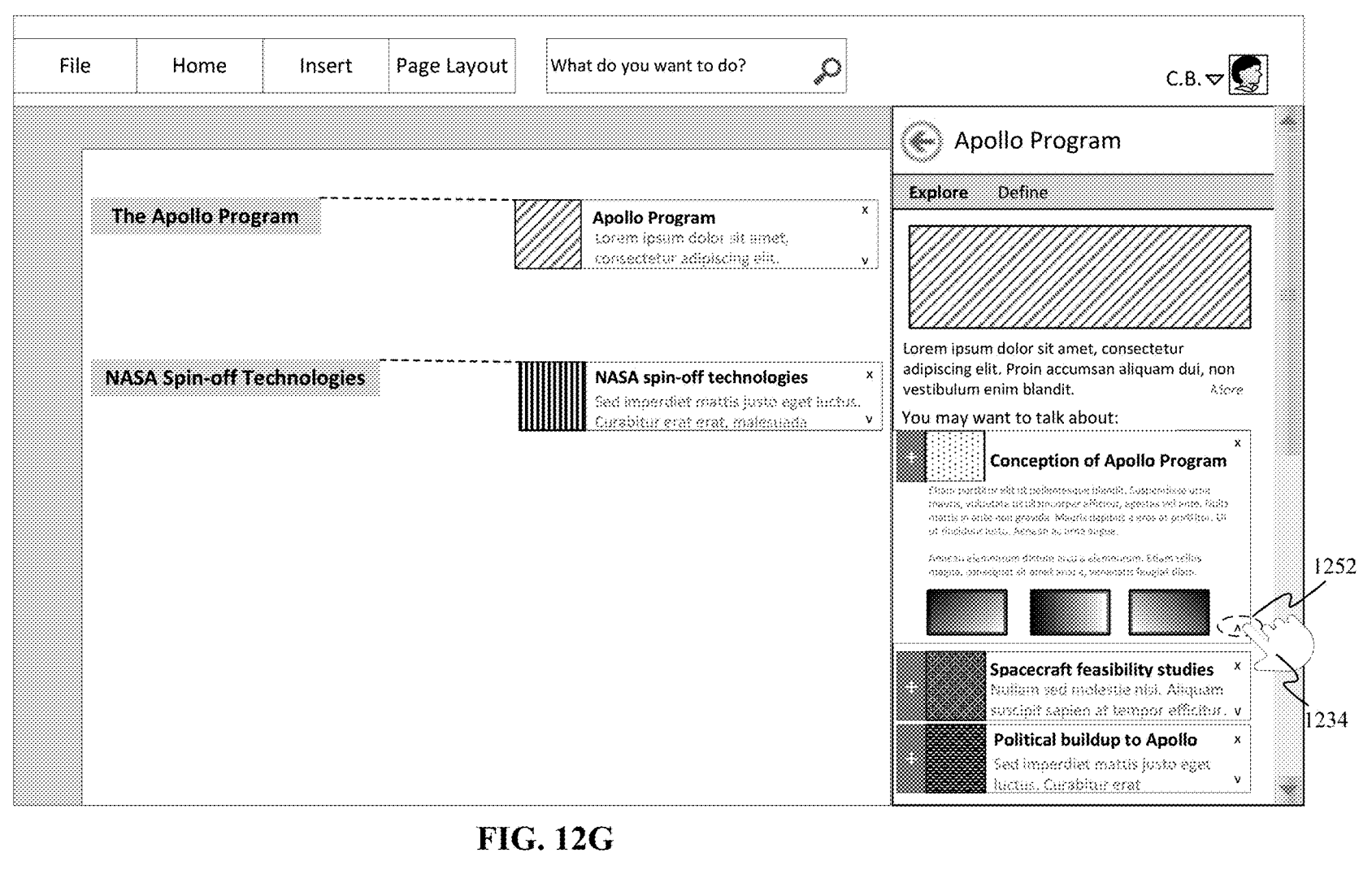
Figure 12H:
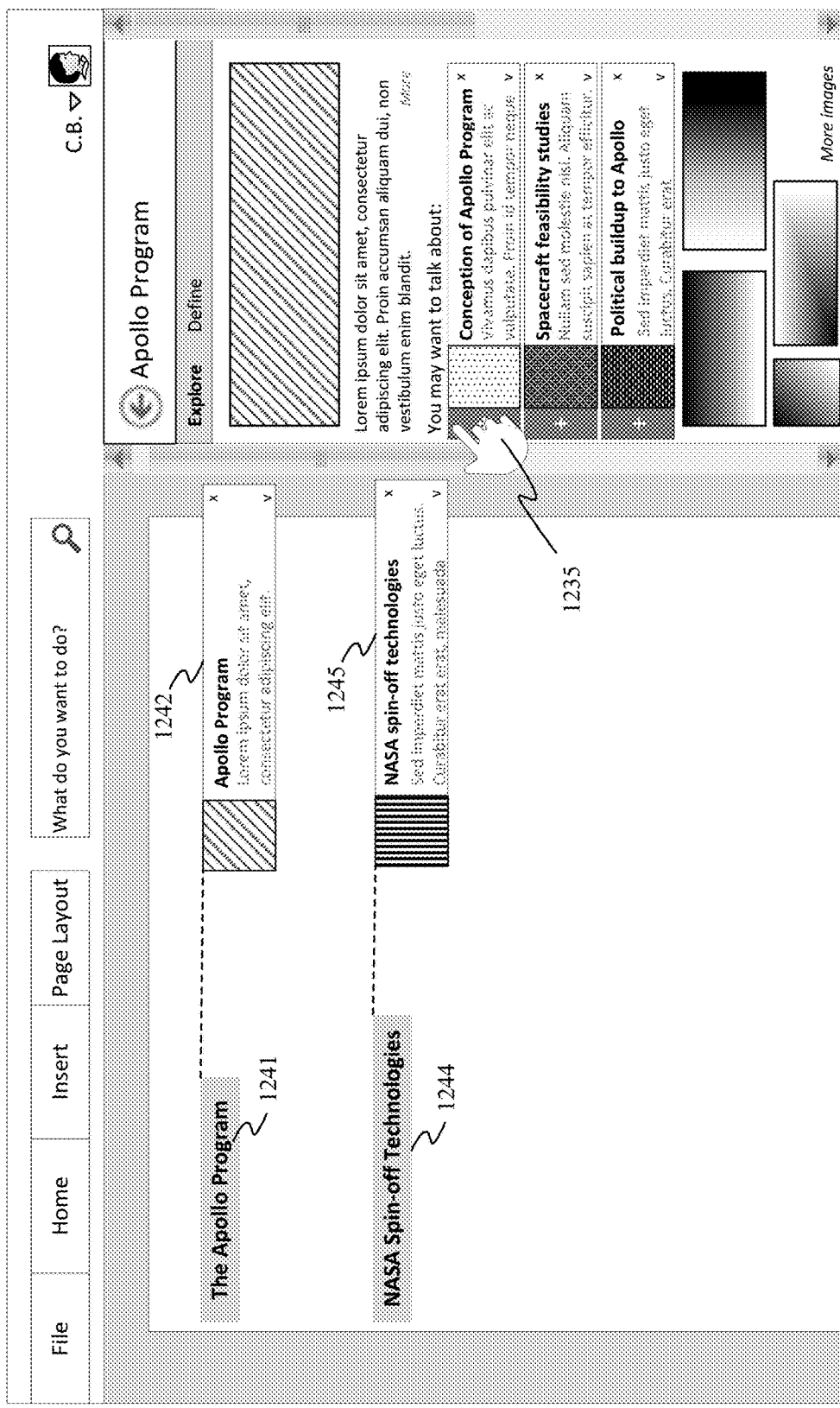
Figure 12I:
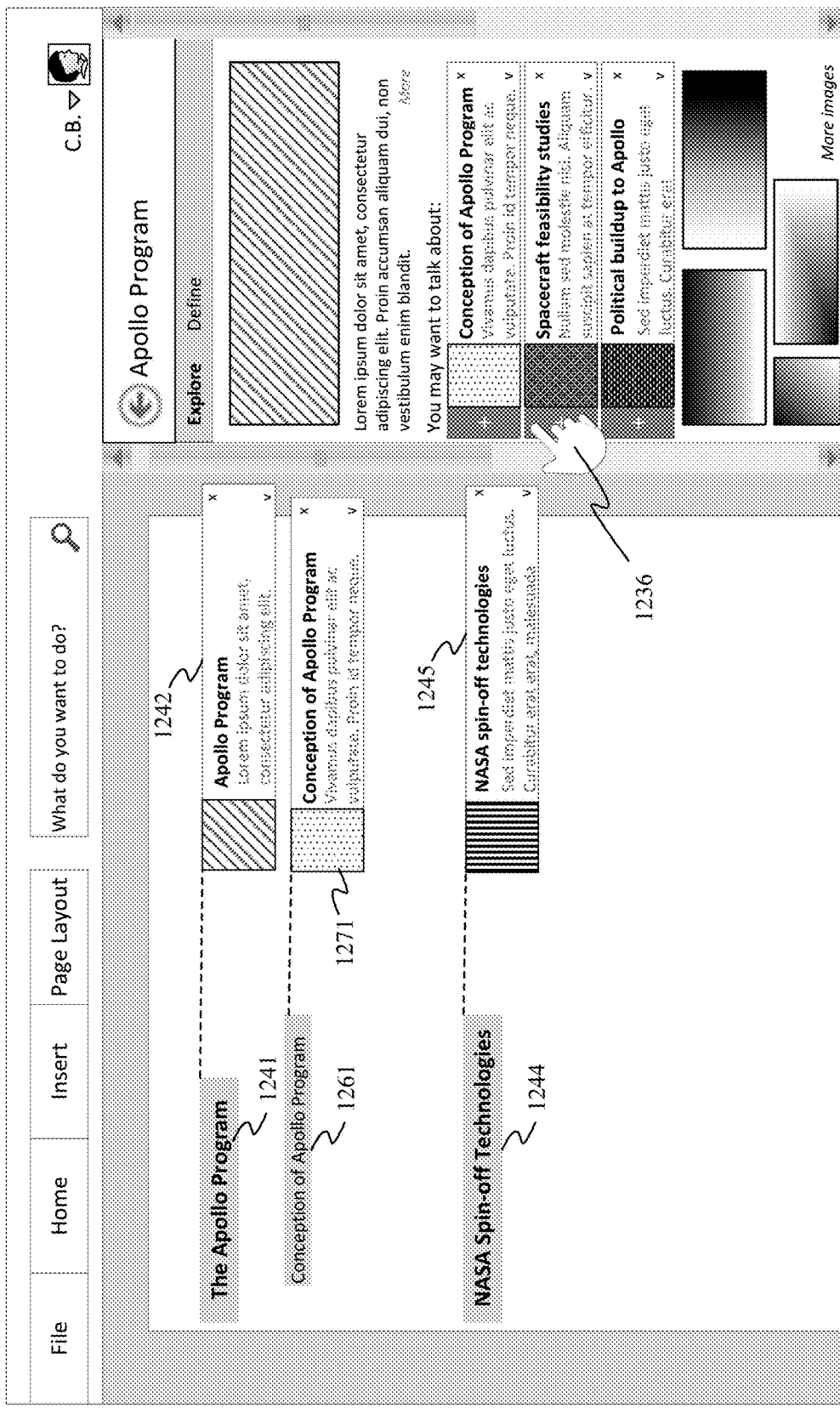
Figure 12J:

As illustrated in FIG. 12F, the selection of the topic exploration object 1242, results in information showing up in the panel 1210 about the Apollo Program along with additional topics to select. Similar (and/or in addition and/or as an alternative) to the features described with respect to FIGS. 3 and 4A-4C, the information pane 1210 can include navigation elements that enable a user to return to previous results (such as back arrow 1251) or delve deeper into a particular topic while within the pane 1210. For example, a user may select an expansion icon as shown in FIG. 12F to obtain more detail about one of the subtopics provided in state B of the information pane. Here, a selection 1234 on the expansion icon 1252 of the sub-topic "Conception of Apollo Program" 1261 reveals additional details as shown in FIG. 12G (some or all of which may be inserted into the document). A selection 1235 on the retract icon 1253 can return the information pane to its previous state as shown in FIG. 12H.

As more selections are made, as shown in FIGS. 12H-12K, an outline for the essay is generated. In particular, in this illustrative example, the user selects (1235 in FIG. 12H, 1236 in FIG. 12I, and 1237 in FIG. 12J) the respective subtopics "Conception of Apollo Program" 1261, 'Spacecraft feasibility studies" 1262, and "Political buildup to Apollo" 1263. Each of these subtopics can have an associated topic exploration object 1271, 1272, 1273 marked on the document with the headers generated from inserting the subtopics. The insertion location may be based on the hierarchical structure of the content (e.g., subtopics will be inserted below the corresponding higher level topic so that other higher level topics are moved further down the page); and/or the insertion location may be based on the location of last contact, for example by indication from a mouse, touch or other indication for curser position.

Figure 12K:
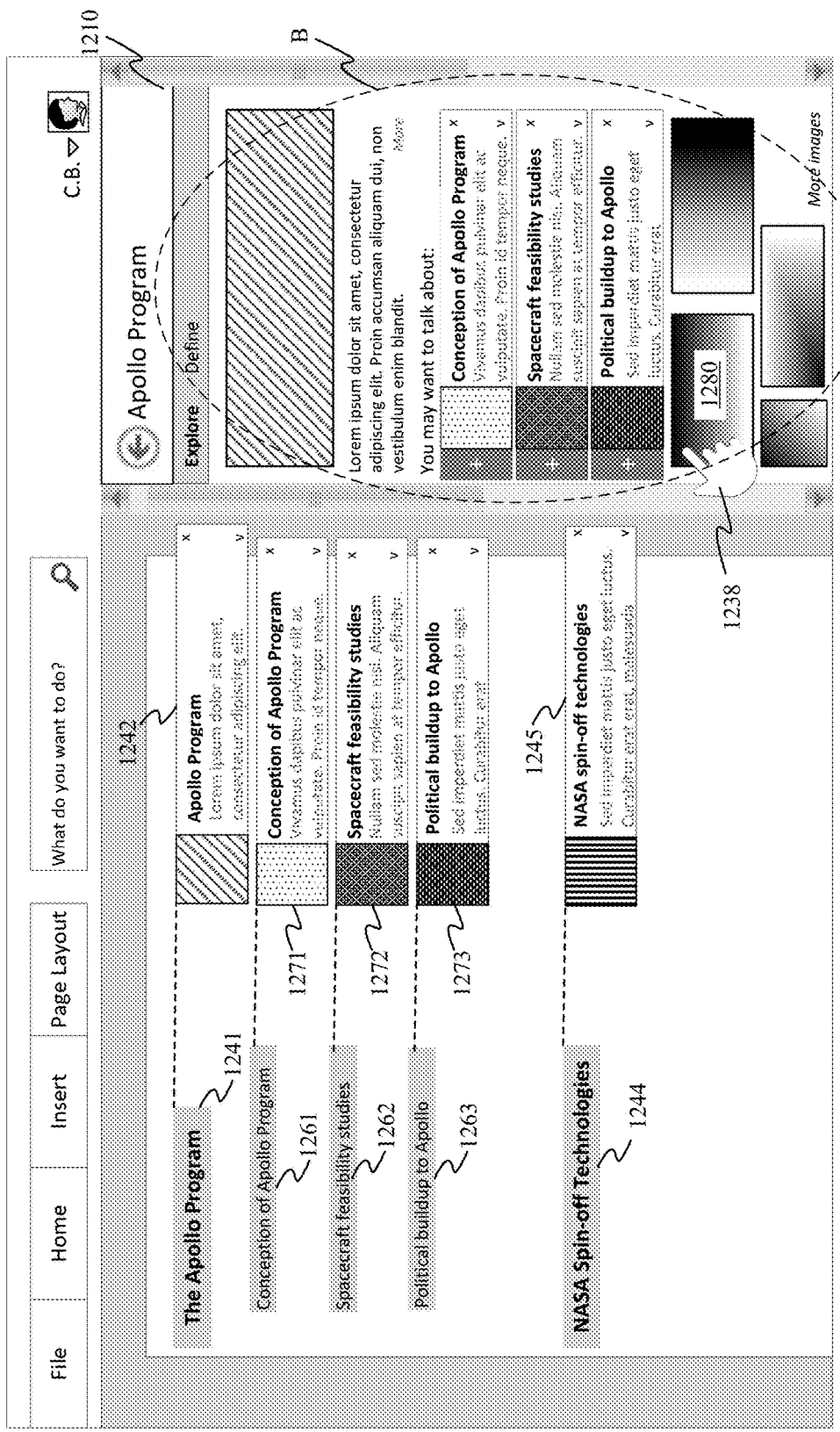

As illustrated in FIG. 12K, the outline with heading "The Apollo Program" 1241, its subheadings "Conception of Apollo Program" 1261, 'Spacecraft feasibility studies" 1262, and "Political buildup to Apollo" 1263, and next heading "NASA Spin-off Technologies" 1244 can be easily inserted into the user's document. Not only are these headings and subheading able to be inserted into the user's document (based on the content returned as part of the results in the information pane) to provide place-holder sections, but the application further provides a graphical user interface via topic exploration objects displayed corresponding to any or all of the headings and subheadings. These topic exploration objects provide an entry to an information pane and the productivity tool providing relevant results (as described with respect to FIGS. 2A-7).

Figure 12L:
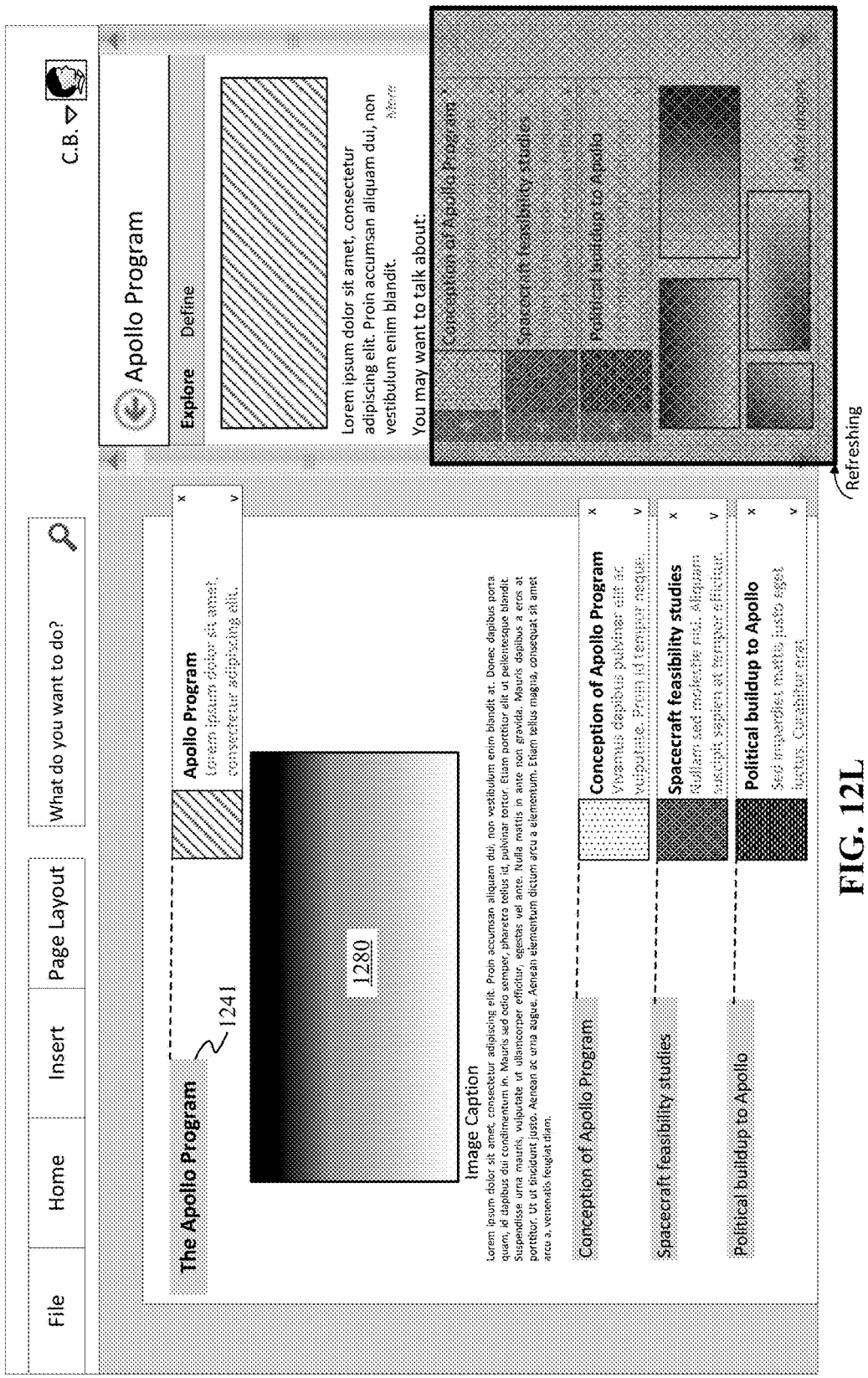

In addition to inserting headings (and topic exploration objects), images and/or other content may be inserted into the document from the information pane as illustrated in FIGS. 12K-12L. For example, as shown in FIG. 12K, a user may select 1238 an image 1280 provided in state B of the information pane 1210, and this image can automatically be inserted into the document under the heading "The Apollo Program" 1241 along with any content that may be provided as part of the selection as shown in FIG. 12L.

As the user pulls in topics to the document and begins writing original content, the application can takes this signal and use it to suggest more relevant and interesting topics to the user. For example, after the user has inserted various content and headings from the content provided in state A and state B of the information pane 1210, the pane can "refresh" 1290 as shown in FIG. 12L and transform into state C illustrated in FIG. 12M. By considering relationships between the topics and text in the document, the productivity application is able to make interesting new connections that the user might have otherwise missed. This is then surfaced to the user in the form of additional suggested topics.

Figure 13:
FIG. 13 illustrates how different signals can be combined in order to suggest new topics.

The topic exploration objects enable a user to direct the suggested topics to those relevant to the topic indicated by the topic exploration object. The example shown in FIG. 13 illustrates how different signals can be combined in order to suggest new topics. FIG. 13 illustrates a state in which two headers 1301, 1302 are shown in the authoring surface of the document 1300 with corresponding topic exploration objects 1311, 1312 displayed in the margin 1320 of the document 1300. In addition, the user may have authored (or otherwise inserted) some text under the two headers 1301, 1302. The productivity tool can, in response to a request for suggested topics (or relevant content), provide relevant content from the various signals in the document. Here, the content of document 1300 is used to generate various suggested topics. The example combinations of content "Apollo Program" 1. "multiple American Presidents" 2, "NASA Spin-off Technologies" 3, and "increased enrollment at engineering programs" 4 for the example results of are shown as indicated by the suggested topics of "Space Race", "Space Exploration Milestones, 1957-69", "Kennedy—Space Policy", 'Flame-resistant textiles", "Freeze-dried food", and "Apollo Program Scholarship" in the Figure. For example, the connection between "Apollo Program" 1 (topic) and "multiple American Presidents" 2 (user text) is used to suggest "Kennedy—Space Policy." Similarly, the connections between "Apollo Program" 1 (topic), "NASA Spin-off Technologies" 3 (topic) and "increased enrollment at engineering programs" 4 (user text) are used to suggest the "Apollo Program Scholarship", a fund established for aspiring aeronautical engineers established in the 1960s. The indirect connection cluster (described with respect to FIG. 10) can be used to achieve these results.

Figure 12M:
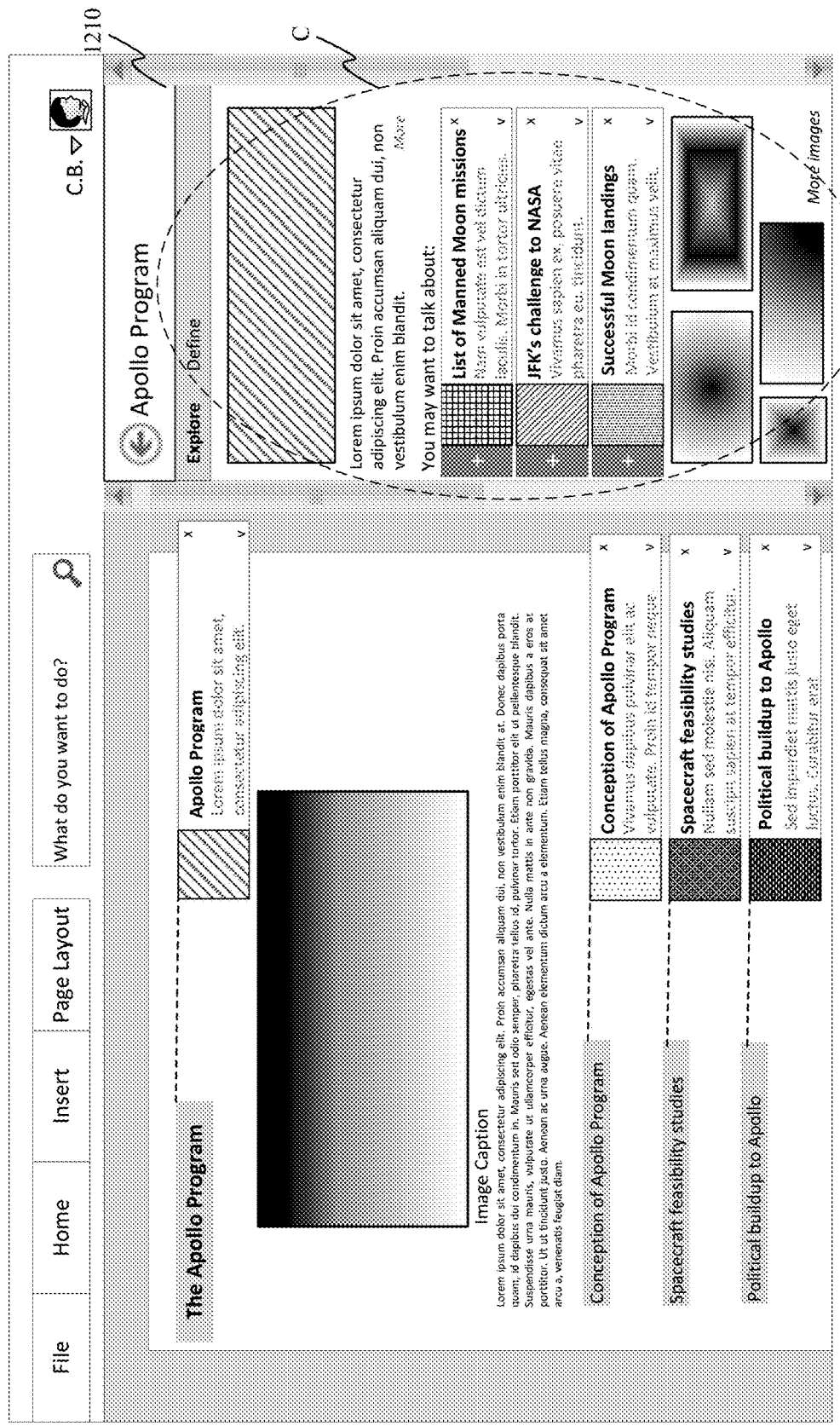
Figure 14B:
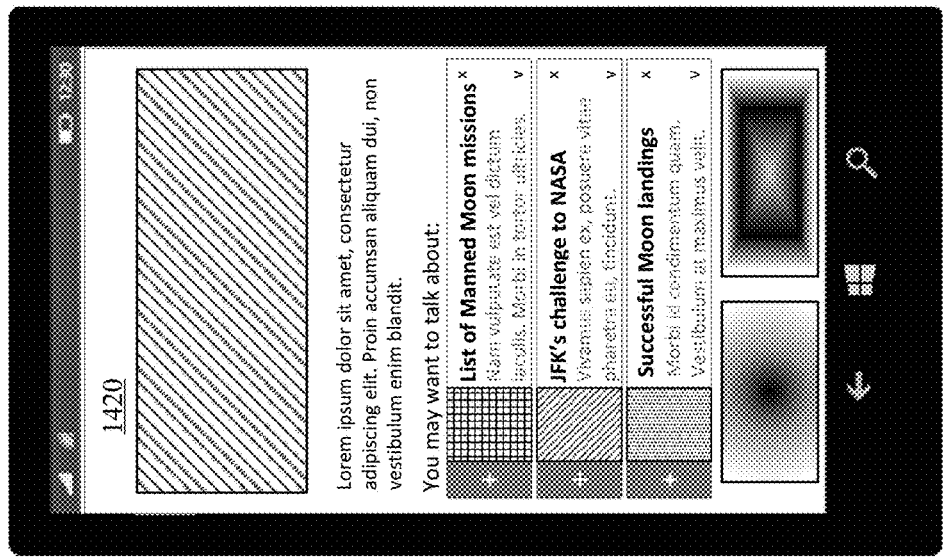
Figure 14A:
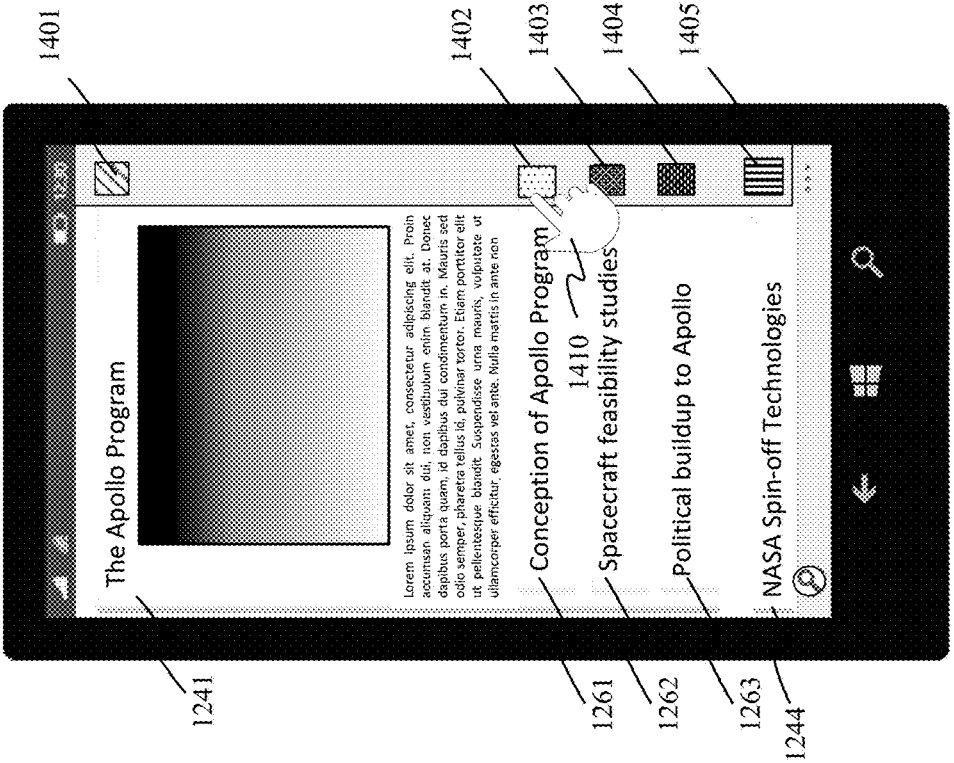

FIGS. 14A-14F illustrate a mobile experience providing topic exploration objects. FIG. 14A starts with the document having content as illustrated in FIGS. 12L and 12M. Due to the small form factor, the topic exploration objects can be presented in a small side panel or side margin region for easy selection. For example topic exploration objects 1242, 1271, 1272, 1273, and 1245 (see e.g., FIG. 12K) become topic exploration objects 1401, 1402, 1403, 1404, and 1405 with corresponding headings and subheadings (e.g., "The Apollo Program" 1241, its subheadings "Conception of Apollo Program" 1261, 'Spacecraft feasibility studies" 1262, and "Political buildup to Apollo" 1263, and next heading "NASA Spin-off Technologies" 1244). Then, if a user selects (e.g., selection 1410) one of the topic exploration objects, such as the topic exploration object 1402 for the "conception of Apollo Program 1261, an information screen 1420 can be displayed with similar content as shown in FIG. 12M.

In addition to accessing the information pane via the topic exploration objects, the productivity tool and information pane can be accessed by a specific command or entry of an expression into a search bar. For example, as shown in FIG. 14C, selection 1430 of an icon 1431 causes search bar 1440 to be displayed as shown in FIG. 14D. In this scenario, the user enters an expression of intent of "Write about the Soviet program" 1441, which can bring out an information screen 1450 about the soviet space program as shown in FIG. 14E. The user may have typed or spoken the request into the mobile phone. The user can select 1445 to add (using for example the +symbol 1446) the topic to the paper and then close 1447 out of the information screen 1450 as shown in FIG. 14E. The result of selecting to add the topic is the header 1451 (with associated topic exploration object 1452) shown in FIG. 14F, which further expands the user's outline. The header 1451 "Soviet space program" can be inserted corresponding to the cursor insertion point 1460 shown in FIG. 14C (e.g., as a sub-subheading to "Political build-up to Apollo".

As shown in FIG. 14E, the topic exploration objects 1401, 1402, 1403, 1404, and 1405 may be visible (and accessible for selection) while in the information screen 1450. This configuration can be considered to be a menu option for the topic exploration objects. This secondary view (separate from the view where the topic exploration objects are shown in a similar vertical position as the headers) is also applicable to larger form factor implementations. For example, a menu listing the secondary view of the topic exploration objects can be provided as part of a ribbon or menu of a productivity application, a contextual menu, or in pane or separate window.

Certain aspects of the invention provide the following non-limiting embodiments:

Example 1

One or more computer readable storage media having instructions stored thereon that when executed by a processing system direct the processing system to: in response to receiving an indication to insert a topic anchor: detect a location of an insertion point in an authoring surface of a document; create a topic exploration object; and dynamically position a graphical user interface comprising the topic exploration object in a position corresponding to the insertion point.

Example 2

The media of example 1, wherein the instructions that direct the processing system to create a topic exploration object direct the processing system to: populate a location reference field of a data structure for the topic exploration object with identifying information corresponding to the location of the insertion point; and populate a topic content field of the data structure for the topic exploration object with at least an identified topic for the topic anchor.

Example 3

The media of example 2, wherein the instructions that direct the processing system to dynamically position the graphical user interface direct the processing system to: update the location reference field with identifying information corresponding an updated location of the insertion point after the insertion point is moved.

Example 4

The media of any of examples 1-3, wherein the instructions that direct the processing system to dynamically position the graphical user interface direct the processing system to: display the topic exploration object in a margin of the document.

Example 5

The media of any of examples 1-4, further comprising instructions that direct the processing system to: display a menu comprising a secondary view of the topic exploration object for selection separate from the position corresponding to the insertion point.

Example 6

The media of any of examples 1-5, further comprising instructions that direct the processing system to: create a topic header, the topic header providing a title element of the graphical user interface for which the topic exploration object is associated; and insert the topic header at the insertion point.

Example 7

The media of example 6, wherein the instructions that direct the processing system to create a topic header direct the processing system to: extract a title from a selected content displayed in an information pane.

Example 8

The media of any of examples 1-7, further comprising instructions that direct the processing system to: in response to receiving an indication of a selection of the topic exploration object, request content relevant to at least an identified topic for the topic anchor; and present the content for inclusion in the document.

Example 9

The media of any of examples 1-8, wherein the instructions further direct the processing system, in response to receiving the indication to insert the topic anchor, to create an annotation object or field, wherein the graphical user interface comprising the topic exploration object further comprises the annotation object or field associated therewith in the position corresponding to the insertion point.

Example 10

The media of any of examples 1-9, wherein the instructions that direct the processing system to create the annotation object direct the processing system to provide an annotation content field for user-inserted content.

Example 11

A system comprising: a processing system; a display; one or more computer readable storage media; and an application stored on the one or more computer readable storage media and comprising program instructions that, when executed by the processing system, direct the processing system to at least: display a document; display a set of content related to at least one topic determined from a user's expression of intent; in response to receiving an indication to insert a topic anchor of an identified topic corresponding to at least one content of the set of content: detect a location of an insertion point in an authoring surface of the document; create a topic exploration object; create a topic header, the topic header providing a title element for which the topic exploration object is associated; insert the topic header at the insertion point; and dynamically position the topic exploration object in a position corresponding to the insertion point.

Example 12

The system of example 11, wherein the program instructions that direct the processing system to create a topic exploration object direct the processing system to: populate a location reference field of a data structure for the topic exploration object with identifying information corresponding to the location of the insertion point; and populate a topic content field of the data structure for the topic exploration object with at least the identified topic for the topic anchor.

Example 13

The system of example 12, wherein the program instructions that direct the processing system to dynamically position the graphical user interface direct the processing system to: update the location reference field with identifying information corresponding an updated location of the insertion point after the insertion point is moved.

Example 14

The system of any of examples 11-13, wherein the program instructions that direct the processing system to dynamically position the graphical user interface direct the processing system to: display the topic exploration object in a margin of the document.

Example 15

The system of any of examples 11-14, further comprising program instructions that direct the processing system to: display a menu comprising a secondary view of the topic exploration object for selection separate from the position corresponding to the insertion point.

Example 16

The system of any of examples 11-15, wherein the program instructions that direct the processing system to create a topic header direct the processing system to: extract a title from a selected content of the set of content.

Example 17

The system of any of examples 11-17, further comprising program instructions that direct the processing system to: in response to receiving an indication of a selection of the topic exploration object, request content relevant to at least the identified topic for the topic anchor; and present the content for inclusion in the document.

Example 18

The system of any of examples 11-17, further comprising program instructions that direct the processing system to: create an annotation object or field in association with the topic exploration object; and display a field to receive user-inserted content with the topic exploration object in the position corresponding to the insertion point.

Example 19

A method of facilitating content authoring, comprising: in response to receiving a request for a topic anchor: detecting a location of an insertion point in an authoring surface of the document; creating a topic exploration object; creating a topic header, the topic header providing a title element for which the topic exploration object is associated; inserting the topic header at the insertion point for display on the authoring surface of the document, dynamically positioning the topic exploration object in a position corresponding to the insertion point; and in response to receiving an indication of a selection of the topic exploration object: requesting content relevant to at least an identified topic for the topic anchor; and displaying the content for inclusion in the document.

Example 20

The method of example 19, wherein creating the topic exploration object comprises: populating a location reference field of a data structure for the topic exploration object with identifying information corresponding to the location of the insertion point; and populating a topic content field of the data structure for the topic exploration object with at least an identified topic for the topic anchor.

Example 21

The method of examples 19 or 20, wherein dynamically positioning the topic exploration object comprises: displaying the topic exploration object in a margin of the document at a vertical position corresponding to the insertion point.

Example 22

The method of any of examples 19-21, wherein creating the topic header comprises: extracting a title from a selected content displayed in an information pane.

Example 23

The method of any of examples 19-22, further comprising: in response to receiving an indication to insert a second topic anchor of an identified topic corresponding to at least one of the content relevant to the identified topic for the topic anchor: creating a second topic exploration object, creating a second topic header, the second topic header providing a second title element for which the second topic exploration object is associated; inserting the second topic header at a second insertion point for display on the authoring surface of the document; and dynamically positioning the second topic exploration object to be displayed in a same vertical position as the second topic header.

Example 24

The method of any of examples 19-23, further comprising: creating an annotation object and displaying a field in which content may be inserted with the topic exploration object.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. One or more computer readable storage media having instructions stored thereon that when executed by a processing system direct the processing system to:
   display an application graphical user interface;
   display a document in an authoring surface of the application graphical user interface;
   display a set of one or more content related to at least one topic determined from a user's expression of intent input as text in a research region of the application graphical user interface, wherein at least one content of the set of content includes a title and corresponding text related to the at least one topic determined from the user's expression of intent;

in response to receiving a user's selection of the one or more content, subsequently inserting, in a topic insertion region of the authoring surface, a topic anchor of an identified topic corresponding to the at least one selected content of the set of content by:
    detecting a location of an insertion point in the authoring surface of the document;
    creating a topic header, the topic header comprising the title;
    inserting the topic header at the location of the insertion point in the topic insertion region to display the title;
    creating a topic exploration object, wherein the topic exploration object comprises an annotation field or an object and is displayed with the title of the selected content and at least a portion of the corresponding text of the selected content; and
    dynamically positioning a display of a graphical user interface comprising the topic exploration object in a topic exploration object region in a position corresponding to but separate from the insertion point in the topic insertion region, wherein the graphical user interface comprising the topic exploration object is marked with a connecting line attached to the topic header displaying the title;
wherein the research region is separate from the topic exploration object region and the topic insertion region; and
in response to receiving an annotation in the graphical user interface in the topic exploration object region, store the annotation in the annotation field or the object of the topic exploration object.

2. The media of claim 1, wherein the instructions for creating the topic exploration object direct the processing system to:
    populate a location reference field of a data structure for the topic exploration object with identifying information corresponding to the location of the insertion point; and
    populate a topic content field of the data structure for the topic exploration object with at least the identified topic for the topic anchor.

3. The media of claim 2, wherein the instructions for dynamically positioning the display of the graphical user interface direct the processing system to:
    update the location reference field with identifying information corresponding to an updated location of the insertion point after the insertion point is moved.

4. The media of claim 1, wherein the instructions for dynamically positioning the display of the graphical user interface direct the processing system to:
    display the topic exploration object in a margin of the document.

5. The media of claim 1, further comprising instructions that direct the processing system to:
    display a menu comprising a secondary view of the topic exploration object for selection separate from the position corresponding to the insertion point.

6. The media of claim 1, further comprising instructions that direct the processing system to:
    in response to receiving an indication of a selection of the topic exploration object, request content relevant to at least the identified topic for the topic anchor; and present the content for inclusion in the document.

7. The one or more computer readable storage media of claim 1, further comprising instructions that direct the processing system to:
    in response to receiving a request to insert a selection of the annotation into the authoring surface of the document, insert the selection of the annotation into the authoring surface of the document.

8. A system comprising:
a processing system;
a display;
one or more computer readable storage media; and
an application stored on the one or more computer readable storage media and comprising program instructions that, when executed by the processing system, direct the processing system to at least:
    display an application graphical user interface;
    display a document in an authoring surface of the application graphical user interface;
    display a set of one or more content related to at least one topic determined from a user's expression of intent input as text in a research region of the application graphical user interface, wherein at least one content of the set of content includes a title and corresponding text related to the at least one topic determined from the user's expression of intent;
    in response to receiving a user's selection of the one or more content, subsequently inserting, in a topic insertion region of the authoring surface, a topic anchor of an identified topic corresponding to the at least one selected content of the set of content by:
        detecting a location of an insertion point in the authoring surface of the document;
        creating a topic exploration object, wherein the topic exploration object comprises an annotation field or an object and is displayed with the title of the selected content and at least a portion of the corresponding text of the selected content;
        creating a topic header, the topic header comprising the title of the selected content;
        inserting the topic header at the location of the insertion point in the topic insertion region to display the title; and
        dynamically positioning a display of a graphical user interface comprising the topic exploration object in a topic exploration object region in a position corresponding to but separate from the insertion point in the topic insertion region, wherein the graphical user interface comprising the topic exploration object is marked with a connecting line attached to the topic header displaying the title;
    wherein the research region is separate from the topic exploration object region and the topic insertion region; and
    in response to receiving an annotation in the graphical user interface in the topic exploration object region, store the annotation in the annotation field or the object of the topic exploration object.

9. The system of claim 8, wherein the program instructions for creating the topic exploration object direct the processing system to:
    populate a location reference field of a data structure for the topic exploration object with identifying information corresponding to the location of the insertion point; and
    populate a topic content field of the data structure for the topic exploration object with at least the identified topic for the topic anchor.

10. The system of claim 9, wherein the program instructions to for dynamically positioning the display of the graphical user interface direct the processing system to:
update the location reference field with identifying information corresponding an updated location of the insertion point after the insertion point is moved.

11. The system of claim 8, wherein the program instructions to for dynamically positioning the display of the graphical user interface direct the processing system to:
display the topic exploration object in a margin of the document.

12. The system of claim 8, further comprising program instructions that direct the processing system to:
display a menu comprising a secondary view of the topic exploration object for selection separate from the position corresponding to the insertion point.

13. The system of claim 8, further comprising program instructions that direct the processing system to:
in response to receiving an indication of a selection of the topic exploration object, request content relevant to at least the identified topic for the topic anchor; and present the content for inclusion in the document.

14. The system of claim 8, further comprising:
in response to receiving a request to insert a selection of the annotation or the at least one content of the set of content into the authoring surface of the document, insert the selection of the annotation or the at least one content of the set of content into the authoring surface of the document.

15. A method of facilitating content authoring, comprising:
displaying an information pane, the information pane providing one or more content determined from an identified entity, domain, topic, relevant information, or combination thereof and a title for each of the one or more content, wherein the entity, domain, topic or relevant information is identified based upon data received implicitly or explicitly, and wherein the data is indicative of a user's expression of intent;
in response to receiving a user's selection of the one or more content:
detecting a location of an insertion point in an authoring surface of a document;
creating a topic exploration object, the topic exploration object comprising the selected content of the content determined from the user's expression of intent and the title for the selected content;
creating a topic header, the topic header comprising the title for the selected content;
inserting the topic header at the location of the insertion point to display the title on the authoring surface of the document; and
dynamically positioning a display of a graphical user interface comprising the topic exploration object in a position in a region corresponding to but separate from a region comprising the insertion point; and
in response to receiving an indication of a selection of the topic exploration object through interaction with the graphical user interface comprising the topic exploration object:
requesting content relevant to the selected content provided in the selected topic exploration object; and
updating the information pane to include the content relevant to the selected content provided in the topic exploration object of the graphical user interface.

16. The method of claim 15, wherein creating the topic exploration object comprises:
populating a location reference field of a data structure for the topic exploration object with identifying information corresponding to the location of the insertion point; and
populating a topic content field of the data structure for the topic exploration object with at least an identified topic for the topic anchor.

17. The method of claim 15, wherein dynamically positioning the topic exploration object comprises:
displaying the topic exploration object in a margin of the document at a vertical position corresponding to the insertion point.

18. The method of claim 15, further comprising:
in response to receiving an indication to insert a second topic anchor of an identified topic corresponding to a second content of the content relevant to the content provided in the topic exploration object of the graphical user interface:
creating a second topic exploration object, the second topic exploration object comprising the second content and a second title;
creating a second topic header, the second topic header comprising the second title;
inserting the second topic header at a location of a second insertion point to display the second title on the authoring surface of the document; and
dynamically positioning a display of a second graphical user interface comprising the second topic exploration object in a position in a region corresponding to but separate from a region comprising the second insertion point.

* * * * *